(12) United States Patent
Yamamoto et al.

(10) Patent No.: US 7,193,941 B2
(45) Date of Patent: Mar. 20, 2007

(54) OPTICAL DISC DRIVE WITH CLOCK SYNCHRONIZATION AND ROTATIONAL SPEED DETECTION

(75) Inventors: Takeharu Yamamoto, Takatsuki (JP); Yoshihiro Kanda, Osaka (JP); Takashi Kishimoto, Nara (JP); Rie Takahashi, Hirakata (JP); Tetsuya Shihara, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 489 days.

(21) Appl. No.: 10/401,449

(22) Filed: Mar. 28, 2003

(65) Prior Publication Data

US 2003/0185115 A1    Oct. 2, 2003

(30) Foreign Application Priority Data

Mar. 29, 2002    (JP)    .............................. 2002-096448

(51) Int. Cl.
*G11B 27/10*    (2006.01)
(52) U.S. Cl. .................................. 369/47.3; 369/47.31
(58) Field of Classification Search ..................... None
See application file for complete search history.

(56) References Cited

U.S. PATENT DOCUMENTS 6,104,682 A    8/2000    Konishi
6,172,952 B1    1/2001    Inokuchi et al.
6,356,522 B1    3/2002    Yamamoto et al.
2002/0110061 A1*    8/2002    Tsuji ........................ 369/47.31

FOREIGN PATENT DOCUMENTS

| JP | 05-225580 A | 9/1993 |
| JP | 11-232651 A | 8/1999 |
| JP | 2001-176207 A | 6/2001 |
| JP | 2001-229564 A | 8/2001 |
| WO | WO 00/63897 | * 4/2000 |

* cited by examiner

*Primary Examiner*—William Korzuch
*Assistant Examiner*—Christopher Lamb
(74) *Attorney, Agent, or Firm*—Akin Gump Strauss Hauer & Feld, LLP

(57) ABSTRACT

An optical disc drive includes: a motor for rotating an optical disc thereon; a photoelectric transducer for converting a light beam, reflected from or transmitted through the disc, into an electric signal; a clock sync signal reader for extracting and outputting a read signal, representing a clock synchronization mark, from the electric signal; a clock generator for generating a clock signal having a variable frequency; a phase locking controller for controlling the clock generator to synchronize the clock signal in phase with the output signal of the clock sync signal reader; and a mechanism for displacing a light beam spot toward a target track on the disc. During a seek operation of displacing the light beam spot toward the target track, the clock generator is controlled to obtain a frequency to be expected on the target track and output a clock signal having the expected frequency.

9 Claims, 18 Drawing Sheets

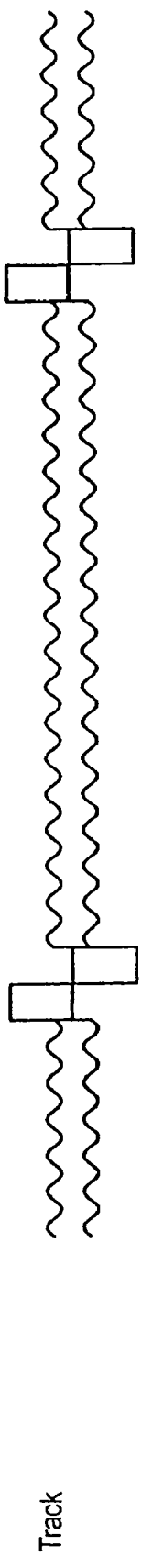
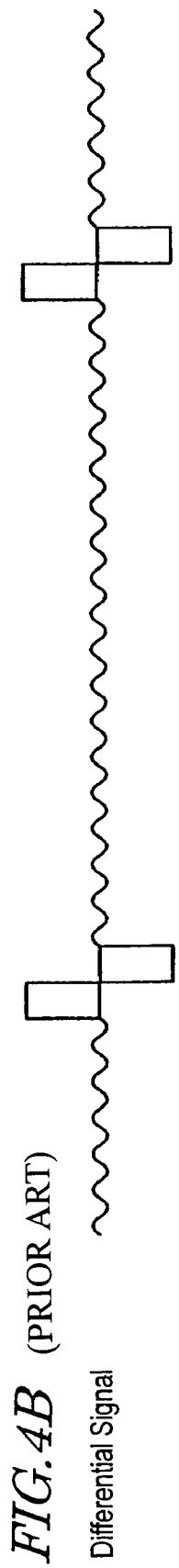
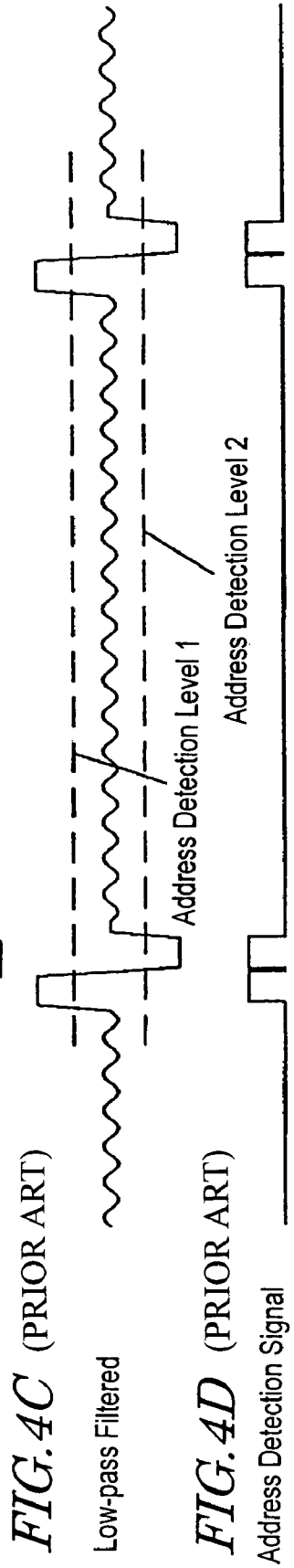
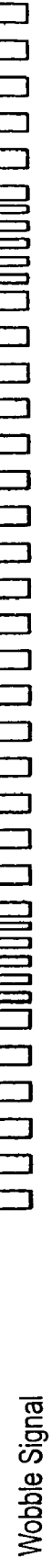
FIG. 4A (PRIOR ART) Track
FIG. 4B (PRIOR ART) Differential Signal
FIG. 4C (PRIOR ART) Low-pass Filtered
FIG. 4D (PRIOR ART) Address Detection Signal
FIG. 4E (PRIOR ART) Bandpass Filtered
FIG. 4F (PRIOR ART) Wobble Signal
Address Detection Level 1
Address Detection Level 2

OPTICAL DISC DRIVE WITH CLOCK SYNCHRONIZATION AND ROTATIONAL SPEED DETECTION

BACKGROUND OF THE INVENTION

1. Field of the Invention

The present invention generally relates to an optical disc drive. More particularly, the present invention relates to the technique of controlling the frequency of a wobble PLL circuit in reading and/or writing information from/on an optical disc with a wobbled track groove and also relates to the technique of switching the characteristics of a bandpass filter for use to detect a wobble signal.

2. Description of the Related Art

FIG. 1A schematically illustrates the overall configuration of an optical disc 101 such as a DVD-RAM. FIG. 1B schematically illustrates a sector arrangement in a zone on the optical disc 101.

As shown in FIG. 1A, the information recording area of the optical disc 101 is divided into a plurality of zones 1102, 1103, etc., each including a plurality of tracks. The optical disc 101 is designed such that the innermost track of one of these zones has the same recording linear density as that of any other zone. That is to say, the recording linear density of the innermost track is constant all over the optical disc 101. Inside of each of these zones, however, the recording linear density decreases outward from the highest density of the innermost track to the lowest density of the outermost track.

Each of these zones 1104 is divided into multiple sectors 1105, 1106, etc., as shown in FIG. 1B. Although not shown specifically in FIG. 1B, each of these sectors includes an address section at the beginning thereof and a data section that follows the address section.

FIG. 2 is a plan view illustrating a detailed arrangement of tracks on the optical disc 101. On the optical disc 101 shown in FIG. 2, land tracks 1201 and groove tracks 1202 are alternately arranged in the radial direction. Each of these tracks 1201 and 1202 includes multiple data sections 1203 or 1204 and multiple address sections 1205 or 1206. The data sections 1203 or 1204 are arranged in the tracking direction at regular intervals, and the address sections 1205 or 1206 are also arranged in the tracking direction at regular intervals. As shown in FIG. 2, each of these address sections 1205 and 1206 is shifted in the disc radial direction by a half track pitch from the center of its associated track such that the address can always be read no matter whether the light beam spot follows the land tracks 1201 or the groove tracks 1202.

In each of these data sections 1203 and 1204, the track 1207 has a wobbled shape to represent clock synchronization marks. One wobbling period is normally several hundred times as long as one period of a data read clock signal.

When a light beam is focused onto the surface of an optical disc, a light beam spot is formed on a track of the disc. While the light beam spot is following the track, the light beam is also reflected from the optical disc. A wobble signal is detected from this reflected light. The wobble signal changes in a period corresponding to that of the wobbled shape of the tracks. Accordingly, a phase-locked loop (PLL) can be controlled by reference to the period of the wobble signal.

FIG. 3 shows a configuration for an optical disc drive that can read and/or write data from/on the optical disc 101.

In the optical disc drive shown in FIG. 3, a light beam is emitted from a head unit 102 so as to be focused onto the optical disc 101. The light beam is reflected from the optical disc 101 and then detected by a photodetector 103 that is provided for the head unit 102. In response, the photodetector 103 converts the received reflected light into an electric signal representing the intensity of the light and outputs it.

In reading and/or writing data from/on the optical disc 101, the optical disc drive operates in such a manner that the focal point of the light beam (i.e., the light beam spot) can follow the center of the tracks on the recording side of the rotating optical disc 101. More specifically, the head unit 102 moves to an appropriate location under the optical disc 101 such that the light beam spot is formed right on the desired track on the disc 101. Meanwhile, the position of the convergent lens (not shown) provided for the head unit 102 is finely adjusted by an actuator (not shown).

To read out data from the optical disc 101, the two output signals of the photodetector 103 shown in FIG. 3 are input to a subtractor 105, thereby detecting a signal from the address section of the track based on the output signal of the subtractor 105. More specifically, the photodetector 103 includes two divided photodiodes a and b, which are arranged in the tangential direction of the track. In this photodetector 103, the light beam that has been received by each of these two photodiodes is converted into an electric signal to be output. The output signal of the subtractor 105 represents the difference between the outputs of the two photodiodes, and includes information about the wobbled shape of the track that is followed by the light beam spot and information about the address section thereof.

FIG. 4A is a plan view schematically illustrating the wobbled shape of the track, while FIG. 4B shows the waveform of the differential signal to be output from the subtractor 105.

In the optical disc drive shown in FIG. 3, an address section detector 106 detects the address section of the track, on which the light beam spot is now located, based on the differential signal shown in FIG. 4B.

Next, the configuration and operation of the address section detector 106 will be described with reference to FIG. 5. FIG. 5 is a block diagram showing the internal configuration of the address section detector 106. As shown in FIG. 5, the output signal of the subtractor 105 (i.e., the differential signal) is supplied to a low-pass filter (LPF) 1401. The LPF 1401 filters out signal components of which the frequencies exceed an RF band in the range of about 1.2 MHz to about 4.5 MHz, for example. The output signal of the LPF 1401 has the waveform shown in FIG. 4C. Although not shown in FIG. 4B, even if such radio frequency (RF) components were included in the differential signal, those RF components would be filtered out by the LPF 1401.

Thereafter, the output signal of the LPF 1401 is compared to two reference levels, thereby detecting the information included in the address section. More specifically, the comparator 1402 shown in FIG. 5 determines whether or not the output of the LPF 1401 is at least equal to address detection level No. 1, while the comparator 1403 shown in FIG. 5 determines whether or not the output of the LPF 1401 is at least equal to address detection level No. 2. As indicated by the dashed lines in FIG. 4C, these address detection levels Nos. 1 and 2 are defined in advance such that the signal read out from the address section is distinguishable from the wobble signal.

As shown in FIG. 5, an exclusive OR gate 1404 obtains the logical sum of the output signals of the two comparators 1402 and 1403, thereby outputting the address detection signal shown in FIG. 4D.

Referring back to FIG. 3, a gate signal generator 113 receives the output signal of the address section detector 106 and then outputs a gate signal to a selector 110 and a data PLL circuit 112. In response to the gate signal, the selector 110 passes the output signal of another selector 109 (i.e., an address read signal) to an equalizer 111. The equalizer 111 has the functions of amplifying the signal components of an input signal in a specified frequency band, filtering out the signal components in the other band and digitizing the input signal, thereby outputting a read RF signal. The read RF signal is input to the data PLL circuit 112, which outputs a data read clock signal synchronously with the read RF signal. The data read clock signal is used as a reference signal in reading out data.

FIG. 6 shows the internal configuration of the data PLL circuit 112. A period measurer 1707 measures the length of one period of the wobble signal and outputs the obtained value to an amplifier 1709. In response, the amplifier 1709 amplifies the value and then outputs it to a comparator 1710. A frequency divider 1705 divides the frequency of the data read clock signal and outputs the resultant signal to another period measurer 1708, which measures the length of one period of that signal. Thus, the comparator 1710 compares the period that has been obtained by the period measurer 1707 to the period that has been obtained by the period measurer 1708. Based on the result of the comparison, the comparator 1710 outputs a control signal to a variable-frequency oscillator (VFO) 1704 by way of a selector 1706 and a phase compensator 1703. The selector 1706 is turned by a system controller 1317 (see FIG. 3). The VFO 1704 controls its oscillation frequency such that the ratio of one period of the data read clock signal to that of the wobble signal equals a predetermined ratio.

In reading an address, or data on the other hand, the system controller 1317 turns the selector 1706 such that the output signal of a phase comparator 1701 is supplied to the VFO 1704 by way of a switch 1702, the selector 1706 and the phase compensator 1703. The phase comparator 1701 compares the phase of the data read clock signal, of which the frequency has been divided by the frequency divider 1705, to that of the read RF signal. In this case, the VFO 1704 controls its oscillation frequency such that the data read clock signal is synchronized with the read RF signal.

Also, an address section gate signal, representing the address section of a sector to read data from, and a data section gate signal, representing the data section of the sector, are input to an exclusive OR gate 1711, which obtains the logical sum of these two gate signals and outputs it to the switch 1702. In this manner, the data PLL circuit 112 performs the phase comparison operation only on the address and data sections of the sector to read the data from.

Referring back to FIG. 3, an address reader 116 reads an address based on the data read clock signal and the read RF signal responsive to the output signal of the gate signal generator 113.

In response to a control signal supplied from the system controller 1317, the selector 109 selects either the output signal of the subtractor 105 or the output signal of an adder 104 to read out the address. The selector 109 makes this decision according to the specific type of the optical disc to read.

Referring to FIG. 7, shown is the internal configuration of the wobble detector 1307. Based on the output signal of the subtractor 105, the bandpass filter of this wobble detector 1307 extracts the wobble signal 1207 from the data section 1203 or 1204 of the track shown in FIG. 2, thereby generating a wobble detection signal. The wobble detection signal may have a waveform such as that shown in FIG. 4E, for example. In the wobble detector 1307, the comparator digitizes the wobble detection signal that has been extracted by the bandpass filter, thereby outputting a wobble signal. The wobble signal may have a waveform such as that shown in FIG. 4F.

In the optical disc drive shown in FIG. 3, a wobble PLL circuit 1308 performs a PLL control in response to the wobble signal. FIG. 8, the internal configuration of the wobble PLL circuit 1308. In FIG. 8, the period measurers 207 and 208, amplifier 209 and comparator 210 together make up a frequency control section.

The period measurer 207 finds the length of one period of the wobble signal and outputs the obtained value to the amplifier 209. In response, the amplifier 209 amplifies the obtained value and then outputs it to the comparator 210. A frequency divider 205 divides the frequency of the wobble clock signal and outputs the resultant signal to another period measurer 208, which finds the length of one period of that signal. Thus, the comparator 210 compares the period that has been obtained by the period measurer 207 to the period that has been obtained by the period measurer 208. Based on the result of the comparison, the comparator 210 outputs a control signal to a variable-frequency oscillator (VFO) 204 by way of a selector 1806 and a phase compensator 203. The selector 1806 is turned by the system controller 1317. The VFO 204, which is exemplary clock generating means, controls its oscillation frequency such that the ratio of one period of the wobble clock signal to that of the wobble signal substantially equals a predetermined ratio.

When this ratio becomes substantially constant, the system controller 1317 turns the selector 1806 such that the output signal of a phase comparator 201 is supplied to the VFO 204 by way of a switch 202, the selector 1806 and the phase compensator 203. The phase comparator 201, which is exemplary phase locking controller, compares the phase of the wobble clock signal, of which the frequency has been divided by the frequency divider 205, to that of the wobble signal. In this case, the VFO 204 controls its oscillation frequency such that the wobble clock signal is synchronized with the wobble signal. The wobble signal can be read only from the data section. Accordingly, the wobble PLL circuit 1308 is designed so as to suspend the phase comparing operation of the phase comparator 201 by turning the switch 202 OFF as soon as the address section detector 106 detects the address section while the wobble PLL circuit 1308 is performing the PLL control to synchronize the wobble clock signal with the wobble signal.

In accordance with the instruction of the system controller 1317, the gate signal generator 113 outputs an address section gate signal, representing the address section, to the selector 110. More specifically, the system controller 1317 instructs the gate signal generator 113 to generate the address section gate signal based on the wobble clock signal if the address reader 116 could read the address successfully but to generate the address section gate signal based on the output signal of the address section detector 106 if the address reader 116 failed to read the address. Also, in reading or writing data from/on the data section, the system controller 1317 instructs the gate signal generator 113 to output a data section gate signal representing the data section.

Furthermore, in writing data on the data section, a writing controller 118 passes write data, which is supplied from the system controller 1317, to the head unit 102 responsive to the data section gate signal and synchronously with the wobble clock signal, thereby writing the data on the optical disc 101.

Such an optical disc drive is disclosed in Japanese Laid-Open Publications No. 05-225580 and No. 2000-100083, for example.

The conventional optical disc drive described above, however, has the following drawbacks. Specifically, while the conventional optical disc drive is not performing a tracking control operation (e.g., during a seek operation to be performed by moving the head unit 102), no wobble signal can be detected from the electric signal being output from the photodetector 103 (i.e., the read signal). Accordingly, during such a period, the conventional optical disc drive cannot perform the wobble PLL control appropriately and may generate a clock signal with a frequency that is significantly different from the originally intended frequency.

Also, the conventional optical disc drive activates the wobble PLL circuit by a wobble signal to be detected after completing the seek operation. Thus, it takes a rather long time for the wobble PLL circuit to lock the VFO to the desired frequency. That is to say, in the conventional optical disc drive, a significant delay is inevitable after the seek operation ended and before the wobble PLL circuit starts to operate normally.

Hereinafter, this problem will be described in further detail with reference to FIG. 9.

FIG. 9 shows the waveform of a tracking error signal, the rotational speed of a disc motor, and the frequency of a wobble clock signal in a situation where an optical disc drive, which has been performing a tracking control operation, once suspends the tracking control operation to carry out a seek operation for a while, and then resumes the tracking control operation.

While an optical disc drive is performing a zoned constant linear velocity (ZCLV) operation, the best disc motor speed and the best wobble clock frequency change with on which track on the optical disc the light beam spot is currently located. In FIG. 9, the best disc motor speed corresponding to the location of the light beam spot before the seek operation is started is identified by N1, while the best disc motor speed corresponding to the location of the light beam spot when the seek operation is finished (i.e., on the target track) is identified by N2. FIG. 9 shows an example in which the light beam spot is displaced outward (i.e., from an inner track position to an outer track position on the disc) as a result of the seek operation.

The conventional optical disc drive discontinues the tracking control operation before starting the seek operation and performs no tracking control operation during the seek operation. Accordingly, during the seek operation, the conventional optical disc drive can detect no wobble signal and the frequency of the wobble clock signal is disturbed as shown in FIG. 9.

On finishing the seek operation at a time t1, the optical disc drive resumes the tracking control operation. Thus, the wobble clock frequency, which has been disturbed during the seek operation, starts to recover at the time t1 to reach the appropriate level at a time t2.

In FIG. 9, the dashed curve 1901 represents the best wobble clock frequency associated with a track that has just been reached as a result of the seek operation (i.e., the target track). Such a wobble clock frequency changes with the rotational speed of the disc motor. During the seek operation, the disc motor speed changes as shown in FIG. 9.

Accordingly, the dashed curve 1901 represents how the wobble clock frequency should change with the disc motor speed on the target track.

At the time t1, the seek operation is finished, the light beam spot reaches the target track, and the tracking control operation starts all over again. However, at this point in time t1, the disc motor speed is still higher than the predetermined speed N2 as shown in FIG. 9. The point in time at which the disc motor speed reaches the predetermined speed N2 shifts with the specific response speed of the motor. Accordingly, even if the wobble clock frequency starts being adjusted as soon as the tracking control operation is restarted, the actual wobble clock frequency matches the ideal one (as indicated by the dashed curve 1901) at no earlier than the time t2. This is because it takes an amount of time of t2–t1 for the wobble PLL circuit to lock the VFO to the desired frequency. For that reason, even if the optical disc drive can perform the seek operation quickly, it still takes a rather long time for the optical disc drive to obtain an appropriate wobble clock signal.

Furthermore, in the conventional optical disc drive, the bandpass filter for use to detect the wobble signal has a fixed frequency characteristic. Accordingly, even if such an optical disc drive tries to perform a read operation at a different rate or a constant angular velocity (CAV) operation, the optical disc drive could miss the wobble signal because the frequency of the wobble signal obtained might be out of the pass band of the bandpass filter.

SUMMARY OF THE INVENTION

In order to overcome the problems described above, a primary object of the present invention is to provide an optical disc drive that can obtain an appropriate wobble clock signal in a shorter time after finishing a seek operation.

Another object of the present invention is to provide an optical disc drive that can prevent the frequency of the wobble signal from falling out of the pass band of the bandpass filter.

An optical disc drive according to a preferred embodiment of the present invention is used to read and/or write information from/onto an optical disc by focusing a light beam onto one of multiple tracks on the disc. Each of those tracks preferably includes a clock synchronization mark and a data section on which the information is recordable The optical disc drive preferably includes: a motor for rotating the optical disc thereon; a photoelectric transducer for converting the light beam, reflected from or transmitted through the optical disc, into an electric signal and outputting the electric signal; a clock sync signal reader for extracting and outputting a read signal, representing the clock synchronization mark, from the electric signal that has been output from the photoelectric transducer; a clock generator for generating a clock signal having a variable frequency; a phase locking controller for controlling the clock generator in such a manner as to synchronize the clock signal in phase with the output signal of the clock sync signal reader; and a mechanism for displacing a spot of the light beam on the optical disc toward a target one of the tracks on the optical disc. While the optical disc drive is performing a seek operation to displace the light beam spot toward the target track on the optical disc, the clock generator is preferably controlled to obtain a frequency to be expected on the target track and output a clock signal having the expected frequency.

In one preferred embodiment of the present invention, the clock generator preferably starts outputting the clock signal having the frequency expected on the target track when the light beam spot starts being displaced at the beginning of the seek operation, but preferably stops outputting the clock signal before the light beam spot reaches the target track.

In another preferred embodiment of the present invention, the optical disc preferably has an information recording area that is divided into a plurality of concentric zones, each including a plurality of tracks. The information is preferably recorded on the optical disc such that the innermost track of each zone has substantially the same highest recording linear density all over the optical disc and that each zone has variable recording linear densities that decrease outward from the highest recording linear density of the innermost track. Each zone preferably includes the clock synchronization marks and the data sections on which the information is recordable.

In still another preferred embodiment, each track of the optical disc preferably has a wobbling structure that shifts periodically in a radial direction, and the wobbling structure preferably functions as the clock synchronization mark.

In this particular preferred embodiment, the wobbling structure of each track on the optical disc preferably also functions as a portion to record address information thereon.

In yet another preferred embodiment, the optical disc drive preferably further includes a rotational speed detector for detecting the rotational speed of the optical disc. If the rotational speed of the optical disc is changeable with where the light beam spot is located on the optical disc, the clock generator is preferably controlled to output a clock signal of which the frequency is determined by the detected rotational speed of the optical disc and a target rotational speed at the zone to which the target track belongs.

In yet another preferred embodiment, the optical disc drive preferably further includes a rotational speed controller for keeping the rotational speed of the optical disc substantially constant. In that case, the clock generator is preferably controlled to output a clock signal of which the frequency is equal to a target frequency at the target track.

An optical disc drive according to another preferred embodiment of the present invention is also preferably used to read and/or write information from/onto an optical disc by focusing a light beam onto the disc. The optical disc preferably includes a clock synchronization mark and a data section on which the information is recordable. The optical disc drive preferably includes: a motor for rotating the optical disc thereon; a photoelectric transducer for converting the light beam, reflected from or transmitted through the optical disc, into an electric signal and outputting the electric signal; a bandpass filter for extracting and outputting a signal in a particular frequency band from the electric signal that has been output from the photoelectric transducer, the frequency band being variable; a clock sync signal reader for extracting and outputting a read signal, representing the clock synchronization mark, from the output signal of the bandpass filter; a clock generator for generating a clock signal having a variable frequency; a phase locking controller for controlling the clock generator in such a manner as to synchronize the clock signal in phase with the output signal of the clock sync signal reader; a linear velocity detector for detecting the linear velocity of the optical disc; and a frequency band controller for controlling the frequency band to be extracted by the bandpass filter in accordance with the output of the linear velocity detector.

An optical disc drive according to still another preferred embodiment of the present invention is also preferably used to read and/or write information from/onto an optical disc by focusing a light beam onto the disc. The optical disc preferably includes a clock synchronization mark and a data section on which the information is recordable. The optical disc drive preferably includes: a motor for rotating the optical disc thereon; a photoelectric transducer for converting the light beam, reflected from or transmitted through the optical disc, into an electric signal and outputting the electric signal; a bandpass filter for extracting and outputting a signal in a particular frequency band from the electric signal that has been output from the photoelectric transducer, the frequency band being variable; a clock sync signal frequency detector for detecting the frequency of a read signal, representing the clock synchronization mark, based on the output signal of the bandpass filter; a read clock generator for generating a read clock signal having a variable frequency; a frequency controller for controlling the read clock generator such that the ratio of the frequency of the read clock signal to the output frequency of the clock sync signal frequency detector equals a predetermined ratio; a phase locking controller for controlling the read clock generator in such a manner as to synchronize the read clock signal in phase with the electric signal that has been output from the photoelectric transducer; a linear velocity detector for detecting the linear velocity of the optical disc; and a frequency band controller for controlling the frequency band to be extracted by the bandpass filter in accordance with the output of the linear velocity detector.

In one preferred embodiment of the present invention, the optical disc drive preferably further includes: a mechanism for displacing a spot of the light beam on the optical disc toward a target track on the optical disc; and a rotational speed detector for detecting the rotational speed of the optical disc. The rotational speed is changeable with where the light beam spot is located on the optical disc. The linear velocity detector preferably detects the linear velocity at a frequency to be determined by the detected rotational speed of the optical disc and a target rotational speed at a zone to which the target track belongs.

In another preferred embodiment of the present invention, the optical disc drive preferably further includes: a mechanism for displacing a spot of the light beam on the optical disc toward a target track on the optical disc; and a rotational speed controller for keeping the rotational speed of the optical disc substantially constant. The linear velocity detector preferably detects the linear velocity depending on to which zone the target track belongs.

In still another preferred embodiment, the optical disc preferably has an information recording area that is divided into a plurality of concentric zones, each including a plurality of tracks. The information is preferably recorded on the optical disc such that the innermost track of each zone has substantially the same highest recording linear density all over the optical disc and that each zone has variable recording linear densities that decrease outward from the highest recording linear density of the innermost track. Each zone preferably includes the clock synchronization marks and the data sections on which the information is recordable.

In yet another preferred embodiment, each track on the optical disc preferably includes an address section. In that case, the optical disc drive preferably further includes: an address section detector for detecting the address section based on the electric signal that has been output from the photoelectric transducer; and a sector time interval measurer for measuring a time interval at which the light beam passes a sector based on the output of the address section detector. The linear velocity detector preferably detects the linear velocity in accordance with the output of the sector time interval measurer.

In yet another preferred embodiment, each track of the optical disc preferably has a wobbling structure that shifts periodically in a radial direction, and the wobbling structure preferably functions as the clock synchronization mark.

In this particular preferred embodiment, the wobbling structure of each track on the optical disc preferably also functions as a portion to record address information thereon.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4A shows an exemplary track structure.

FIGS. 4B through 4F show the waveforms of respective signals for use in the optical disc drive shown in FIG. 3.

DETAILED DESCRIPTION OF PREFERRED EMBODIMENTS

Hereinafter, preferred embodiments of the present invention will be described with reference to the accompanying drawings.

Embodiment 1

First, it will be described with reference to FIG. 10 how the disc motor speed changes when data is read out from an optical disc by the ZCLV method. In this example, to read out data from the optical disc at a constant rate, the rotational speed of the disc motor is changed stepwise with the specific location of the zone, to which the target track containing the desired data belongs, in the disc radial direction.

Figure 10:
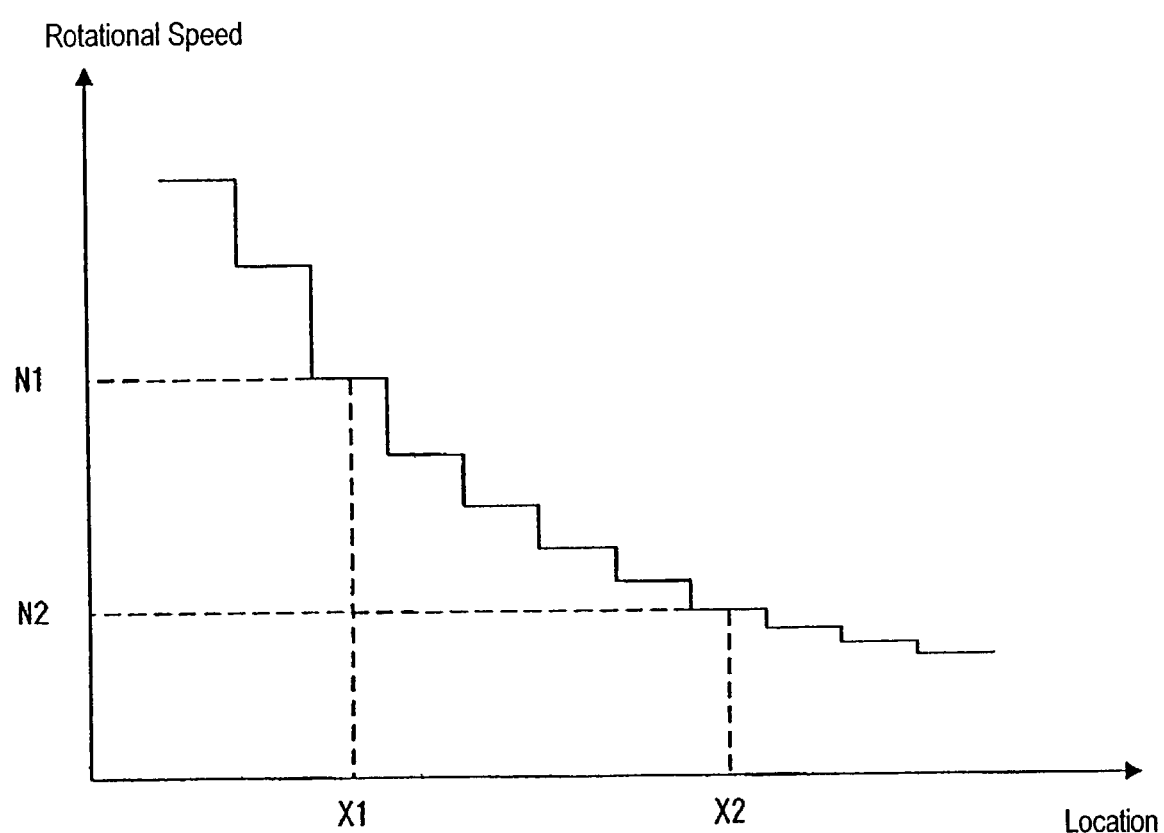
FIG. 10 is a graph showing how the rotational speed of a motor changes with the location of a beam spot during a ZCLV read operation.

In FIG. 10, the ordinate represents the rotational speed of the motor while the abscissa represents the location of the zone including the target track (i.e., the distance as measured from the center of the disc). In the example shown in FIG. 10, the motor speed changes on a zone-by-zone basis. Specifically, the more distant from the center of the disc a given zone is located, the lower the rotational speed of the disc motor becomes.

As shown in FIG. 10, the disc motor speed changes with on which track on the optical disc the light beam spot is now located (i.e., to which zone the track belongs)). For that reason, if the rotational speed of the motor is inappropriate at any zone, the wobble clock signal generated should be adjusted according to the specific rotational speed of the disc motor.

Figure 9:
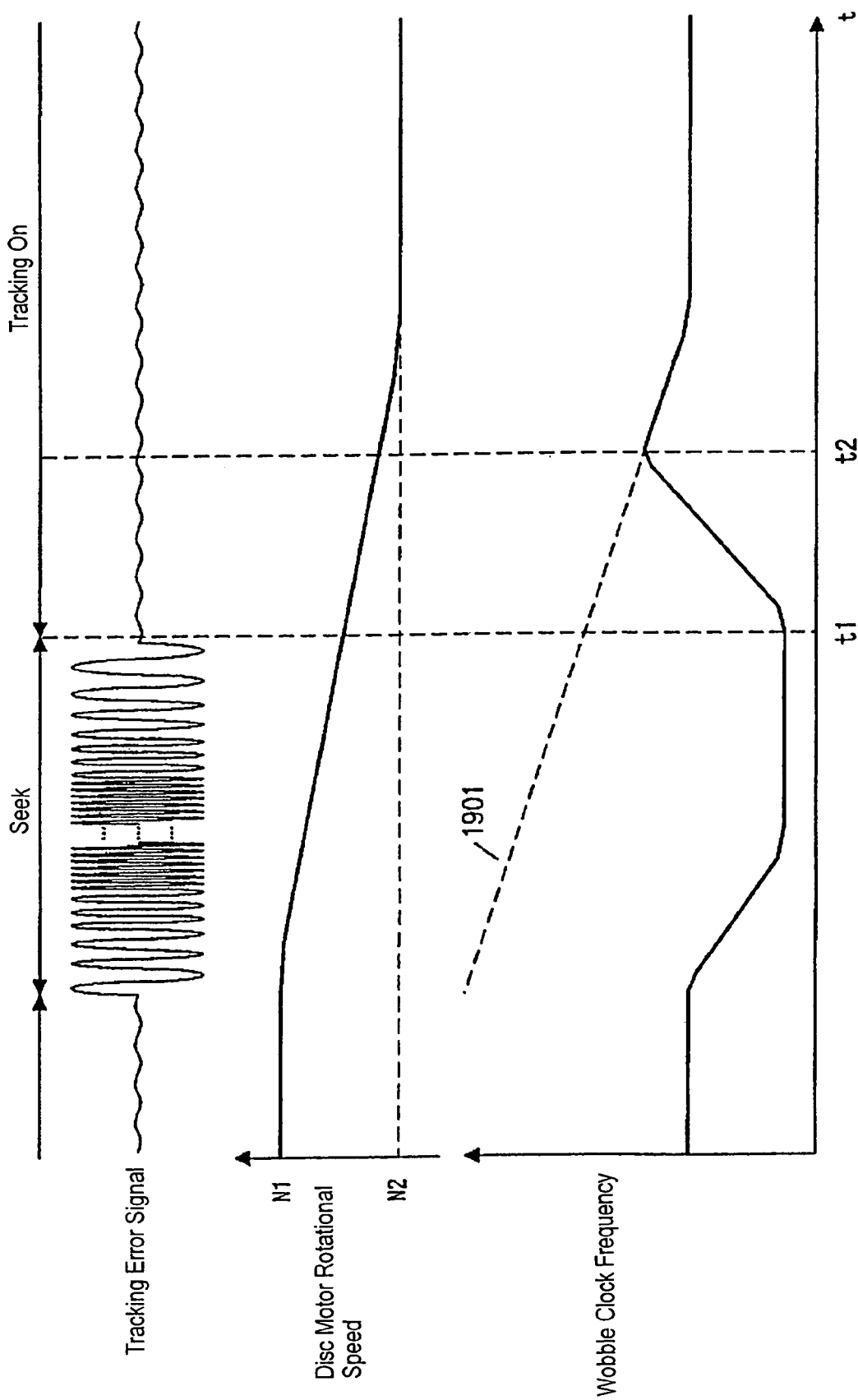
FIG. 9 shows the waveform of a tracking error signal, the rotational speed of a disc motor, and the frequency of a wobble clock signal before, while and after the optical disc drive shown in FIG. 3 performs a seek operation during a ZCLV read operation.
Figure 11:
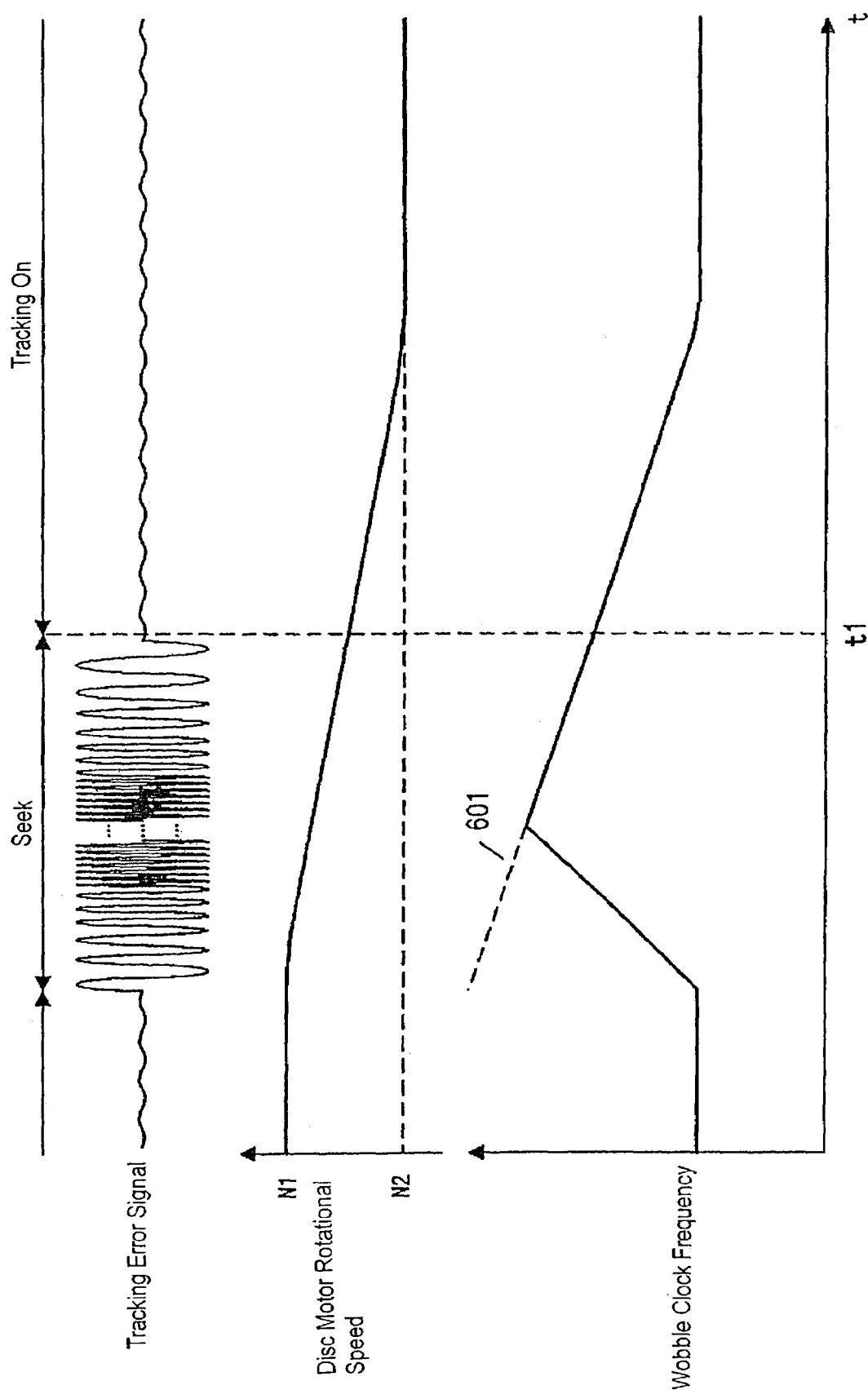
FIG. 11 shows the waveform of a tracking error signal, the rotational speed of a disc motor, and the frequency of a wobble clock signal before, while and after an optical disc drive according to a first specific preferred embodiment of the present invention performs a seek operation during a ZCLV read operation.

Next, referring to FIG. 11, shown are the waveform of a tracking error signal, the rotational speed of the disc motor, and the frequency of a wobble clock signal in a situation where an optical disc drive, which has been performing a tracking control operation, once suspends the tracking control operation to carry out a seek operation for a while, and then resumes the tracking control operation as in FIG. 9.

In FIG. 11, the best disc motor speed corresponding to the location of a light beam spot before the seek operation is started is identified by N1, while the best disc motor speed corresponding to the location of the light beam spot when the seek operation is finished (i.e., on the target track) is identified by N2. FIG. 11 shows an example in which the light beam spot is displaced outward (i.e., from an inner track position to an outer track position on the disc) as a result of the seek operation. In FIG. 11, the dashed line 601 represents the best wobble clock frequency to be determined by the variation in disc motor speed during the movement of the head unit.

In this preferred embodiment, first, the tracking control operation is stopped before the seek operation is started. Next, soon after the seek operation has been started, a frequency to be expected on the target track is obtained and a clock signal having the expected frequency is generated.

Accordingly, the actual wobble clock frequency matches the best wobble clock frequency (as indicated by the dashed line 601) in the middle of the seek operation.

As shown in FIG. 10, to displace the light beam spot from a location X1 to another location X2 on the optical disc, for example, the motor speed should be decreased from N1 to N2. However, if the head unit is driven relatively rapidly to displace the light beam spot to the target zone quickly, then the motor speed will be still higher than N2 when the head unit reaches the target location. Such a gap between the actual and ideal motor speeds is significant particularly when the response of the disc motor is slow.

In that case, the linear velocity of the light beam spot at a time t1, when the seek operation is finished, will be different from the expected velocity. Thus, the actual wobble clock frequency will be different from the expected frequency corresponding to the target location for a while after the head unit has reached the target position.

To overcome such a problem, according to this preferred embodiment, the system controller calculates a corrected target frequency by multiplying the target wobble clock frequency by the ratio N/N2 of the current rotational speed N to the target rotational speed N2 at the destination (i.e., on the target track) that the light beam spot should reach as a result of the seek operation, and instructs a clock generator to generate a wobble clock signal having the corrected target frequency. It should be noted that the dashed line 601 shown in FIG. 11 represents such a corrected target frequency. The closer to the target rotational speed N2 the current rotational speed N of the motor becomes, the closer to one the ratio N/N2 becomes.

Hereinafter, an optical disc drive according to a first specific preferred embodiment of the present invention will be described in further detail with reference to FIG. 12. In the optical disc drive shown in FIG. 12, each component having substantially the same function as the counterpart of the conventional optical disc drive shown in FIG. 3 will be identified by the same reference numeral and the detailed description thereof will be omitted herein.

An optical disc drive according to this preferred embodiment of the present invention reads and/or writes information from/on an optical disc, including a clock synchronization mark and a recordable data section on each of its multiple tracks, by focusing a light beam onto a target one of the tracks on the disc. A typical optical disc of this type may be a DVD-RAM, for example.

Figure 12:
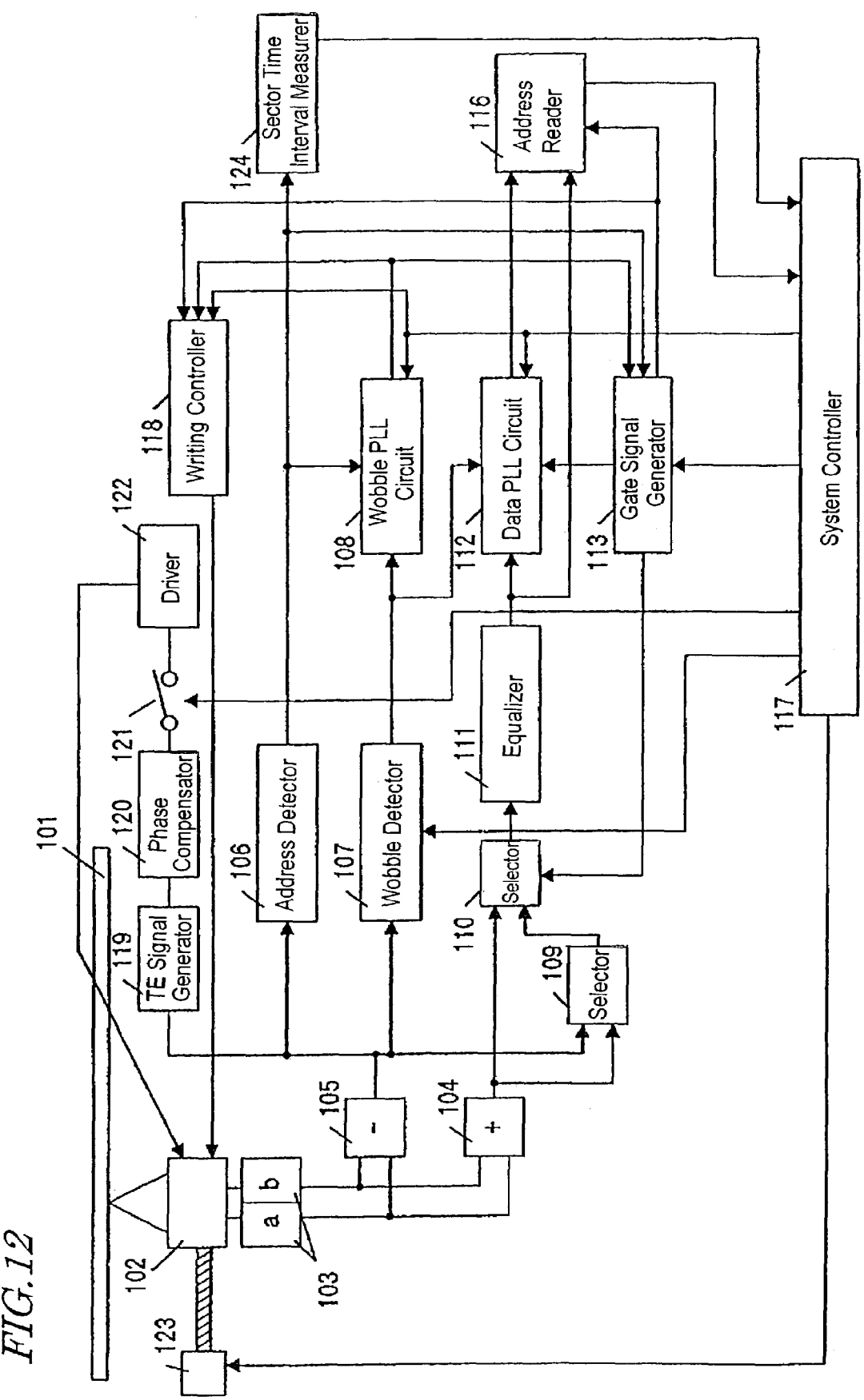
FIG. 12 is a block diagram showing a configuration for an optical disc drive according to the first preferred embodiment of the present invention.

As shown in FIG. 12, the optical disc drive includes: a disc motor (not shown) for rotating an optical disc 101 thereon; a photodetector 103 for converting light, which has been reflected from the optical disc 101, into an electric signal and outputting the electric signal representing the intensity of the reflected light; and a driving mechanism 123 for displacing a spot of the light beam on the optical disc 101 toward a target track on the optical disc 101.

The rotational speed of the disc motor is controlled such that the optical disc drive can read and/or write data from/on the optical disc 101 at a predetermined rate. The optical disc drive performs a focus control such that the light beam spot (i.e., the focal point of the light beam) is located right on the information recording side of the optical disc 101 during the read and/or write operation. The optical disc drive also performs a tracking control in such a manner as to make the light beam spot follow the predetermined tracks on the optical disc 101.

The tracking control may be performed by a conventional method. Specifically, a tracking error signal is generated, and an actuator, provided inside a head unit 102, is driven, and the position of a convergent lens (not shown) is adjusted, in such a manner as to minimize the amplitude of the tracking error signal. The tracking error signal is a signal representing the positional shift of the light beam spot from the track and is generated by a TE signal generator 119 based on the output of a subtractor 105. After having its phase compensated for by a phase compensator 120, the tracking error signal is supplied to a driver 122 by way of a switch 121. The driver 122 can precisely control the position of the convergent lens (not shown) provided for the head unit 102. In this manner, the optical disc drive continuously performs the tracking control such that the focal point of the light beam always follows the tracks on the optical disc 101. However, while performing a seek operation, the optical disc drive opens the switch 121 to turn the tracking control OFF.

The optical disc drive further includes a wobble detector 107 (i.e., a clock sync signal reader) for extracting and outputting a read signal, representing the clock synchronization mark, from the electric signal that has been output from the photodetector 103. The output signal of the wobble detector 107 is supplied to a wobble PLL circuit 108. As will be described in detail later, the wobble PLL circuit 108 includes a clock generator for generating a clock signal having a variable frequency and a phase locking controller for controlling the clock generator so as to synchronize the clock signal in phase with the output signal of the clock sync signal reader.

While the optical disc drive of this preferred embodiment is performing a seek operation to displace the light beam spot on the optical disc 101 toward the target track on the optical disc 101, the clock generator can be controlled to obtain a frequency to be expected on the target track and output a clock signal having the expected frequency.

Figure 1B:
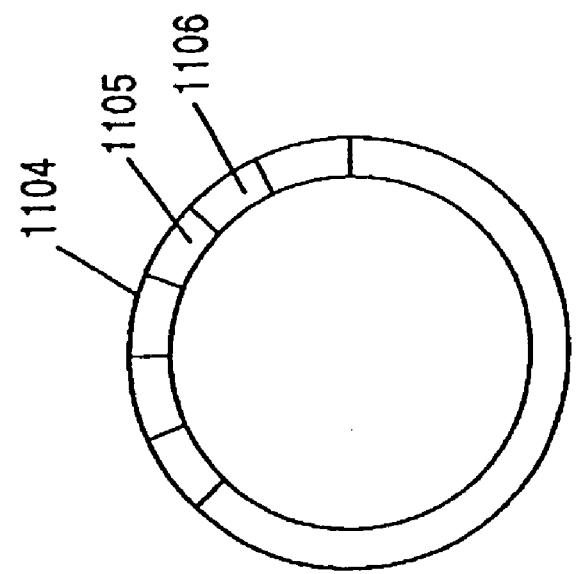
FIG. 1B is a plan view schematically illustrating the format of one of the zones on the optical disc shown in FIG. 1A.
Figure 1A:
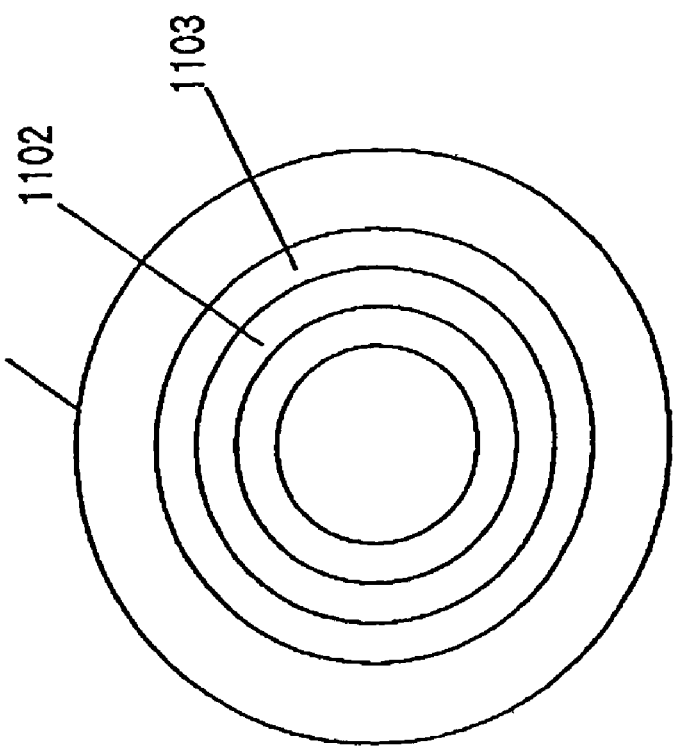
FIG. 1A is a plan view schematically illustrating an optical disc.
Figure 2:
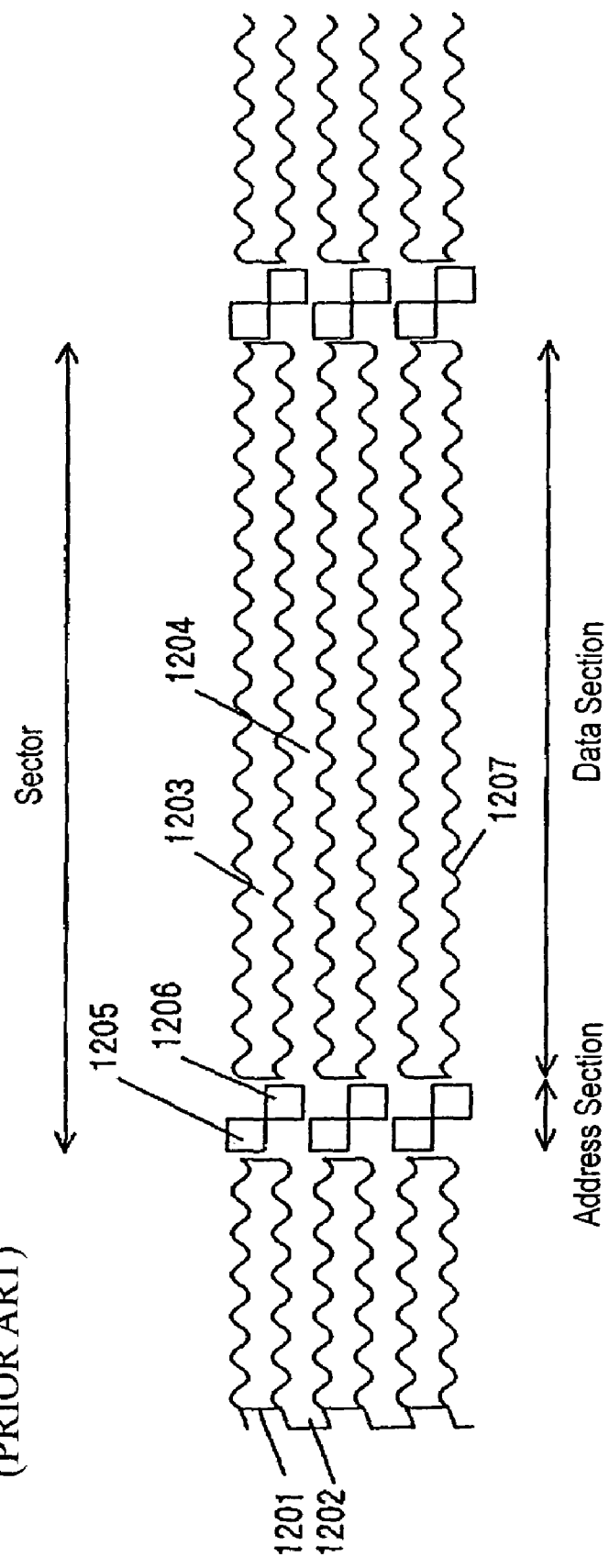
FIG. 2 illustrates the arrangement of tracks on the optical disc shown in FIG. 1A.
Figure 3:
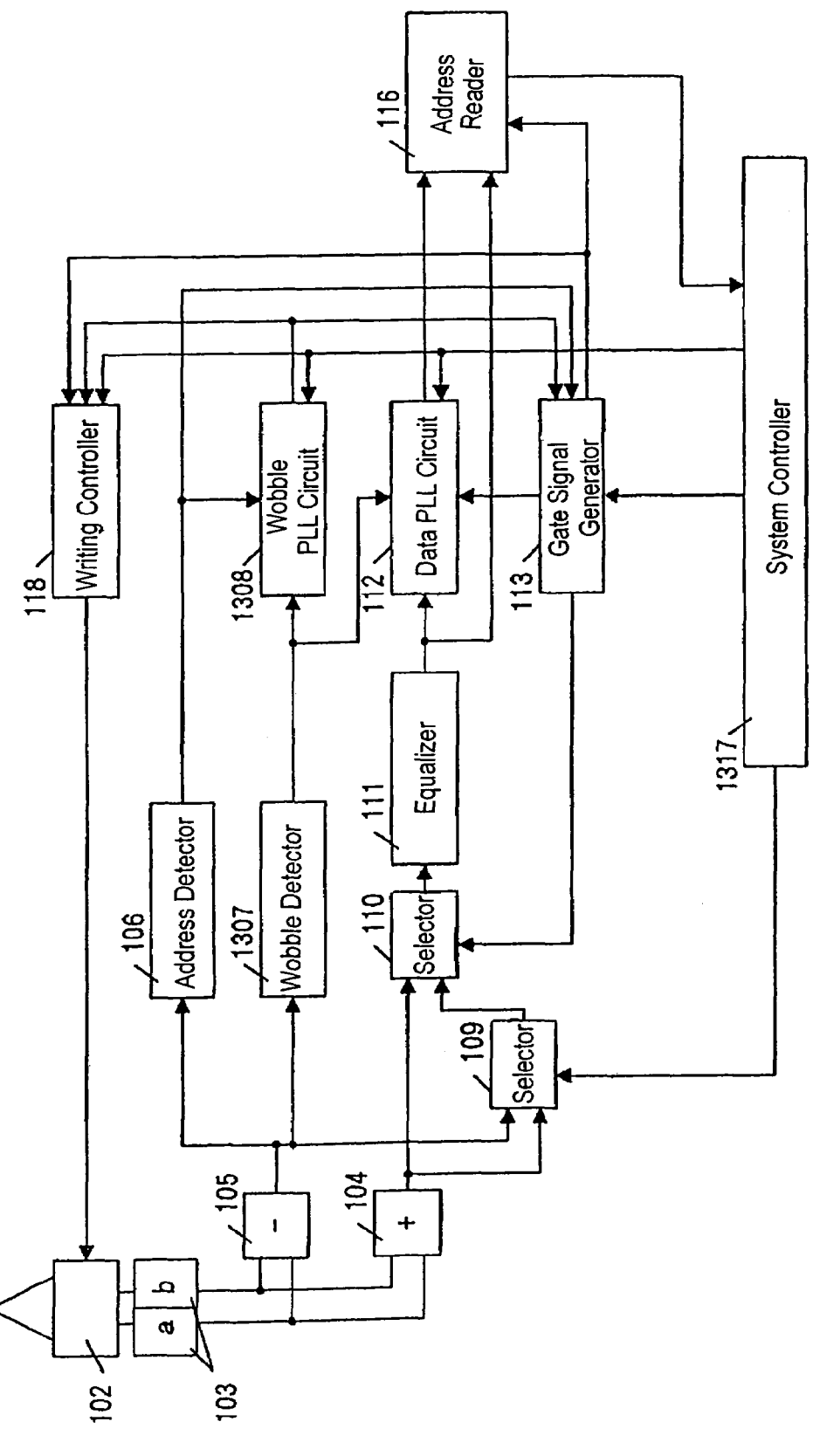
FIG. 3 is a block diagram showing the configuration of a conventional optical disc drive.
Figure 5:
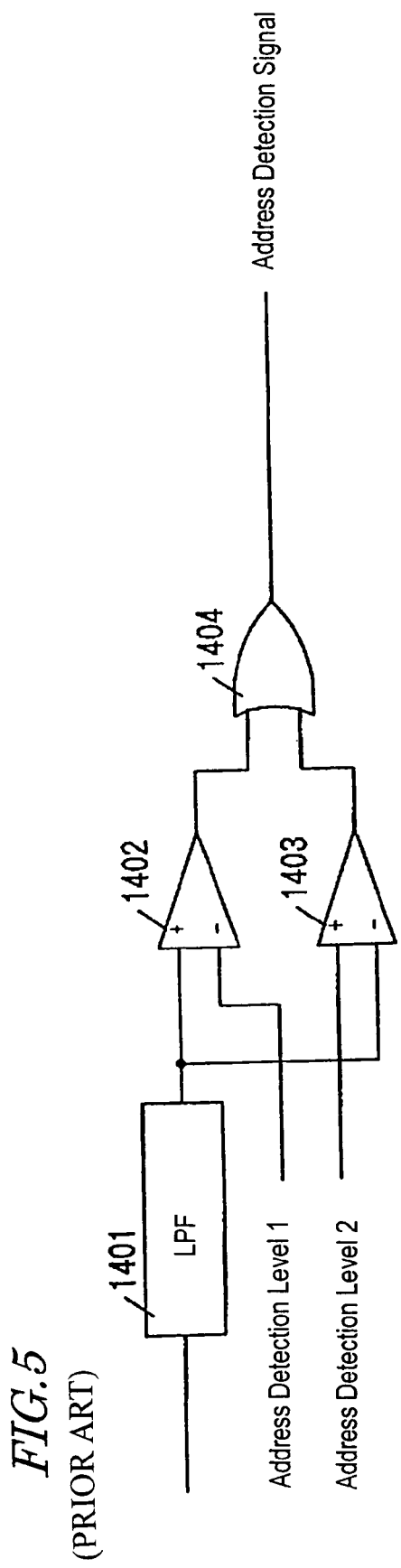
FIG. 5 is a diagram showing the configuration of an address section detector 106 in the optical disc drive shown in FIG. 3.

It should be noted that various components of the optical disc drive shown in FIG. 12, including the selectors 109 and 110, equalizer 111, data PLL circuit 112, gate signal generator 113 and address reader 116, are basically the same as the counterparts of the conventional optical disc drive shown in FIG. 3. Thus, the following description of the optical disc drive of this preferred embodiment will be focused on the configurations and operations of the wobble detector 107 and wobble PLL circuit 108.

First, the wobble PLL circuit 108 will be described.

Figure 8:
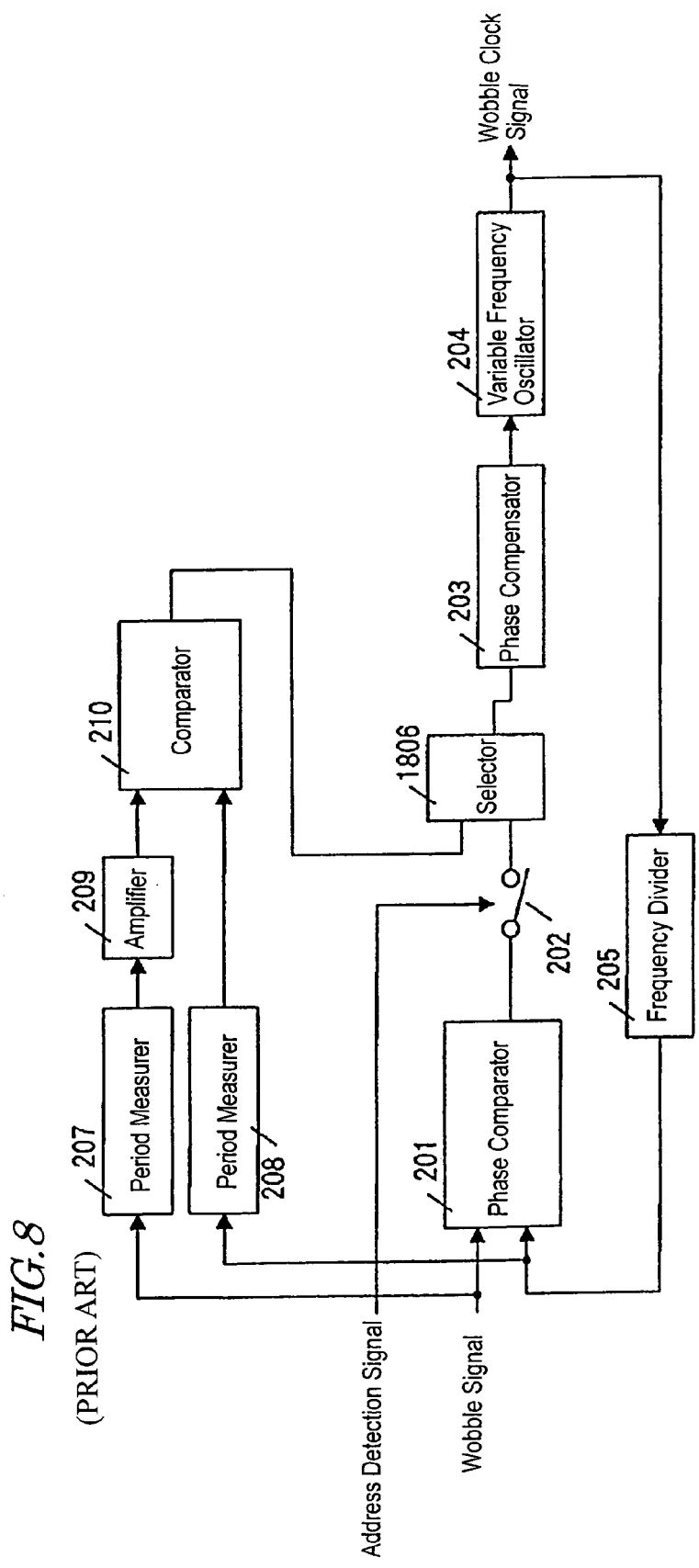
FIG. 8 is a block diagram showing the configuration of a wobble PLL circuit 1308 in the optical disc drive shown in FIG. 3.
Figure 13:
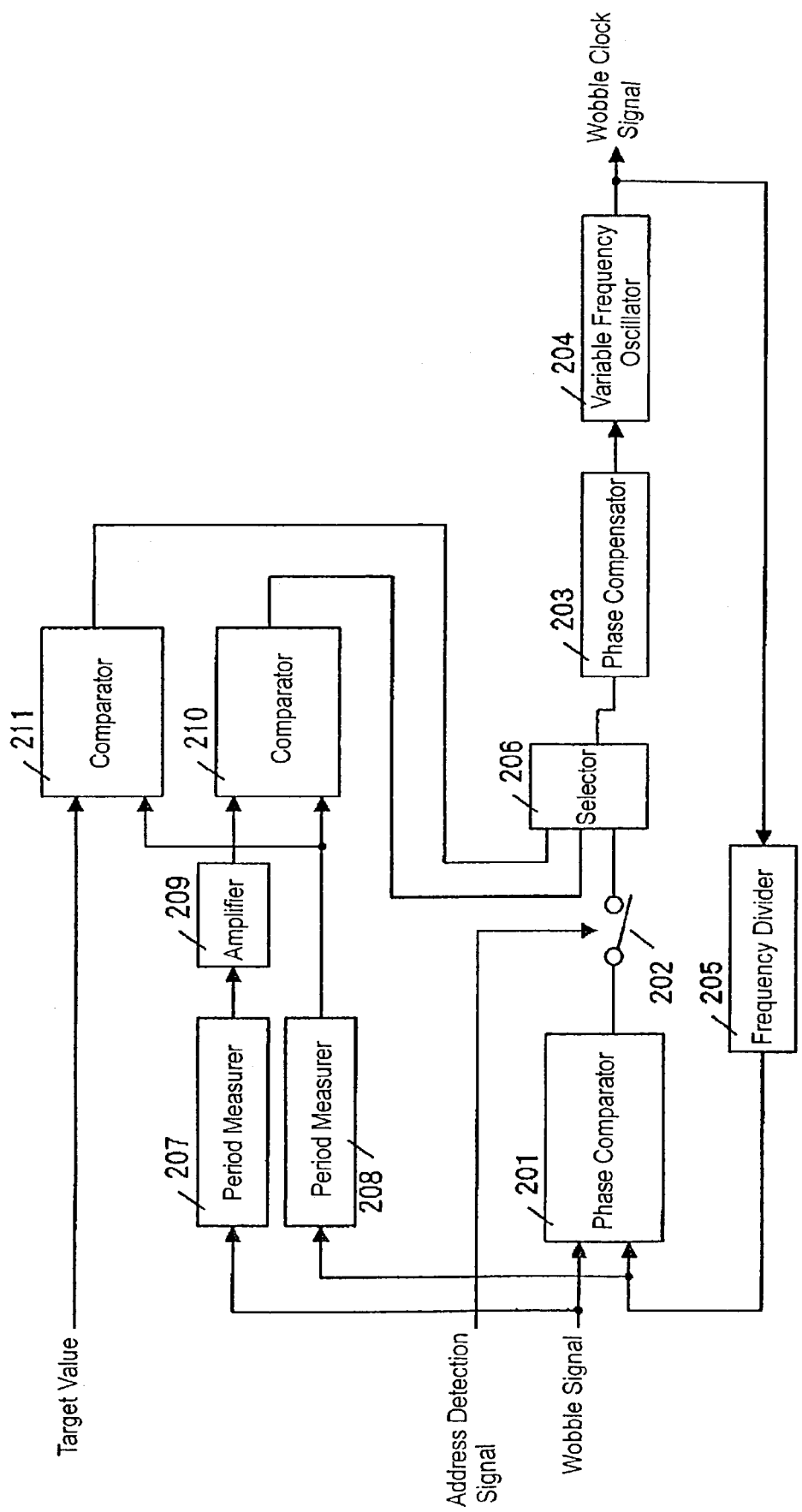
FIG. 13 is a block diagram showing the configuration of a wobble PLL circuit 108 in the optical disc drive shown in FIG. 12.

Referring to FIG. 13, shown is the internal configuration of the wobble PLL circuit 108 compared to the conventional wobble PLL circuit 1308 in FIG. 8.

In this preferred embodiment, the wobble PLL circuit 108 includes a comparator 211, which receives a target wobble clock frequency. The target wobble clock frequency is determined by the target read rate, the current rotational speed of the disc motor and the target rotational speed thereof at the destination, and is input to the comparator 211.

Before the seek operation is started, the selector 206 is turned to the side that passes the output of the phase comparator 201. Accordingly, the wobble clock signal is controlled such that the ratio of the frequency of the wobble clock signal to that of the wobble signal equals a predetermined ratio. That is to say, at this point in time, the wobble clock signal is generated as in the conventional optical disc drive.

Also, at this point in time, the data PLL circuit 112 shown in FIG. 12 controls the data read clock signal such that the ratio of the frequency of the data read clock signal to that of the wobble signal equals a predetermined ratio.

When the optical disc drive starts to drive the head unit 102 in such a state, the system controller 117 turns the switch 121 OFF and supplies a control signal to the driving mechanism 123 as shown in FIG. 12, thereby driving the head unit 102 toward the target track.

While the head unit 102 is being driven toward the target track after the system controller 117 has turned the switch 121 OFF, the selector 206 of the wobble PLL circuit 108 (see FIG. 13) is turned to the other side that passes the output of the comparator 211.

As a result, before the seek operation is finished, a control operation is started to match the wobble clock frequency to the "target frequency". As already described with reference to FIGS. 10 and 11, the target frequency is corrected by being multiplied by the ratio N/N2 of the current rotational speed N of the disc motor to the target rotational speed N2 thereof at the target track.

The value that has been calculated as the target wobble clock frequency is supplied by the system controller 117 to the comparator 211. In response, the comparator 211 compares this target value to the frequency of the wobble clock signal that has passed through the frequency divider 205 and the period measurer 208. Based on the result of this comparison, the frequency of the wobble clock signal is controlled so as to match the frequency as indicated by the dashed line 601 in FIG. 11.

Figure 14:
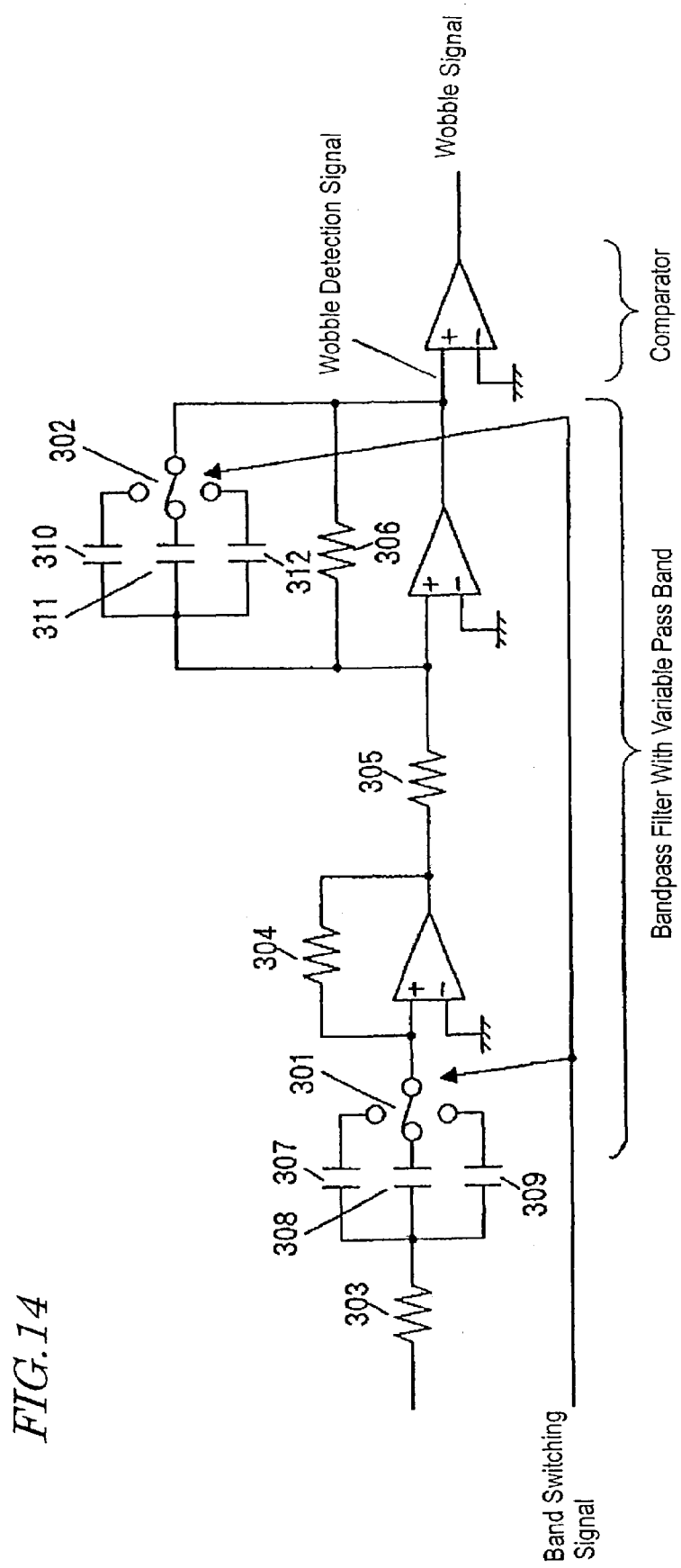
FIG. 14 is a diagram showing the configuration of a wobble detector 107 in the optical disc drive shown in FIG. 12.

Next, the configuration of the wobble detector 107, functioning as the clock sync signal reader, will be described with reference to FIG. 14. As shown in FIG. 14, the wobble detector 107 includes a bandpass filter for extracting a wobble detection signal from a wobble read signal and a comparator for digitizing the wobble detection signal.

The pass band width of the variable bandpass filter is defined by the resistors 303, 304, 305 and 306 and capacitors 307, 308, 309, 310, 311 and 312 shown in FIG. 14.

Figure 15:
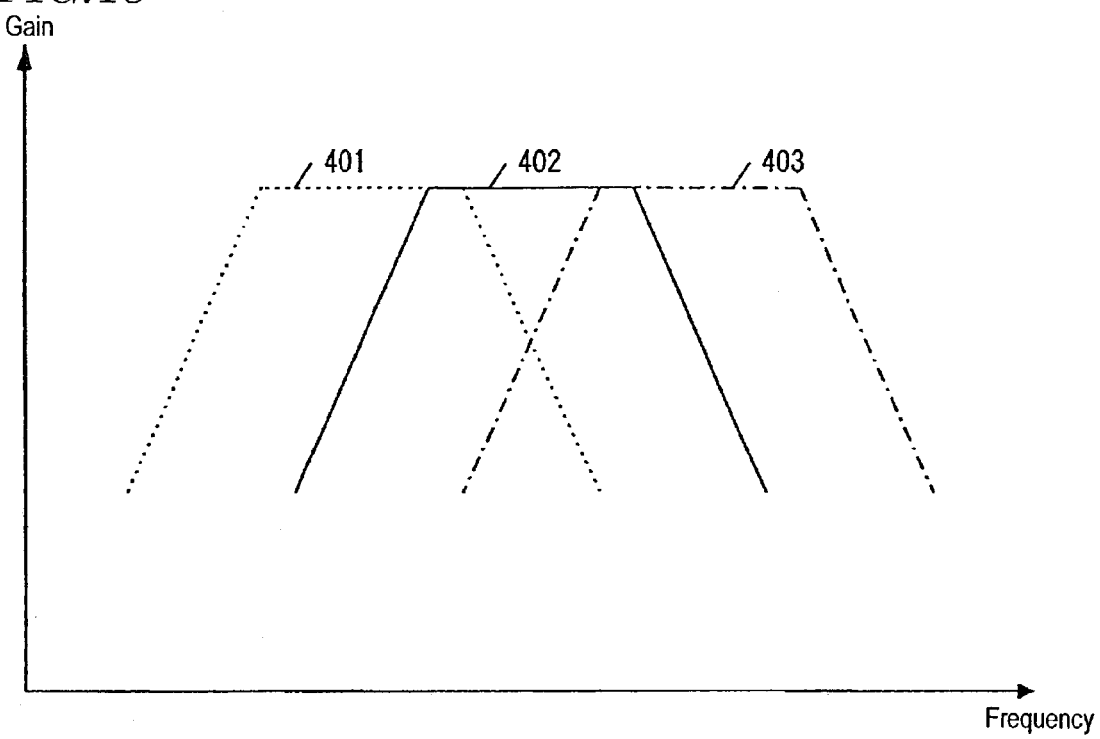
FIG. 15 is a graph showing the characteristics of the bandpass filter in the wobble detector 107 shown in FIG. 14.

The switches 301 and 302 shown in FIG. 14 are turned responsive to a band switching signal supplied from the system controller 117 shown in FIG. 12, thereby changing the pass band width of the variable bandpass filter. The filtering characteristics may be switched among the three pass band widths as indicated by the dotted, solid and one-dot-chain lines 401, 402 and 403 in FIG. 15, for example.

In this preferred embodiment, the system controller 117 can switch the characteristics of the bandpass filter by supplying a control signal to the wobble detector 107. More specifically, the system controller 117 supplies a band switching signal to the switches 301 and 302 to make the bandpass filter exhibit such a filtering characteristic as passing the target wobble clock frequency to be determined by the target read rate, the current rotational speed N of the disc motor and the target rotational speed N2 at the destination. This band switching signal turns the switches 301 and 302, thereby controlling the wobble detector 107 to select an appropriate filtering characteristic from the three filtering characteristics shown in FIG. 15, for example.

In this manner, a signal having the desired frequency can be supplied from the wobble detector 107 to the wobble PLL circuit 108 and the data PLL circuit 112 without allowing any signal having an unwanted frequency to pass therethrough.

By adopting such a configuration, even when the optical disc drive starts to read data at a different read rate or in a CAV mode, the frequency of the wobble signal included in the read signal will never fall out of the pass band of the bandpass filter.

As soon as the seek operation is finished at the time t1, the system controller 117 changes the state of the wobble PLL circuit 108 in FIG. 12 again. More specifically, the system controller 117 not only turns the selector 206 of the wobble PLL circuit 108 (see FIG. 13) to the side that passes the output of the comparator 210 but also turns the switch 121 ON (see FIG. 12). As a result, the optical disc drive starts the tracking control. Thereafter, when the ratio of the frequency of the wobble clock signal to that of the wobble signal equals a predetermined ratio, the system controller 117 turns the selector 206 shown in FIG. 13 again, thereby switching the mode of operation into a PLL phase control in which the wobble signal and the wobble clock signal are synchronized in phase with each other. The PLL phase control may be carried out as already described for the prior art with reference to FIG. 6.

Until the current rotational speed N of the disc motor substantially reaches the target rotational speed N2, the system controller 117 keeps supplying the control signal to the wobble detector 107, thereby turning the switches 301 and 302 appropriately in such a manner as to make the bandpass filter pass the frequency of the wobble signal. The wobble signal frequency is determined by the target read rate, the current rotational speed N of the disc motor and the target rotational speed N2 thereof at the target track.

In the optical disc drive having such a configuration, even if the response of the disc motor is slow, the wobble clock frequency will be close to the frequency at which the wobble signal is read (which will be referred to herein as a "wobble read frequency") when the head unit 102 reaches its destination. Accordingly, the PLL phase control can be started as soon as the head unit 102 arrives at the position under the target track. As a result, the time delay that is normally caused between the end of the seek operation and the start of data reading or writing can be shortened according to this preferred embodiment.

In the preferred embodiment described above, the wobble clock frequency is corrected by reference to the current rotational speed N of the disc motor and the target rotational speed N2 thereof at the target track. However, if the rotational speed N changes significantly, the resultant rotational speed will be much different from the current rotational speed N. In such a situation, even if the wobble clock frequency is corrected, the error might be noticeable.

To overcome such a problem, the optical disc drive preferably further includes a rotational speed detector (not shown) for detecting the rotational speed of the optical disc. In that case, the variable frequency oscillator 204 is preferably controlled, and the wobble clock frequency is preferably defined, by the current rotational speed of the optical disc that has been detected by the rotational speed detector and the target rotational speed thereof at the target track.

More specifically, the next rotational speed is preferably estimated from the previous rotational speed $N_{old}$ and the current rotational speed N by first-order linear interpolation. Using the next rotational speed obtained in this manner and the target rotational speed N2 at the target track, the target frequency is preferably corrected by multiplying the target read clock frequency by $(2 \times N - N_{old})/N2$. The ratio of the target read clock frequency to the wobble clock frequency preferably satisfies a predetermined ratio. By performing such a correction, the precision of correction can be increased. This correction method is particularly effective in a situation where the head unit should be driven over a long distance. This is because the rotational speed of the motor changes significantly when the head unit travels a long distance.

In the preferred embodiment described above, the wobble clock frequency starts being corrected when the seek operation is started. However, the present invention is in no way limited to this specific preferred embodiment. Rather the wobble clock frequency may start being corrected at any time (e.g., even just before the seek operation is finished) as long as the actual wobble clock frequency can be equalized with the ideal wobble clock frequency (indicated by the dashed line 601) at least before the time t1 shown in FIG. 11.

As shown in FIG. 12, the optical disc drive of this preferred embodiment further includes a sector time interval measurer 124. Hereinafter, the function of the sector time interval measurer 124 will be described.

In the conventional optical disc drive, once the light beam spot has gone way off the target track due to the vibration or impact caused by the head unit 102 moving, the wobble read frequency might be out of the pass band of the bandpass filter in the wobble detector 107 even if the switch 121 shown in FIG. 12 is turned ON to start the tracking control operation. In that case, no wobble signal could be detected and the frequency of the wobble clock signal or the read clock signal could not be controlled anymore. If these clock frequencies could not be controlled appropriately, then the address of the target track could not be read.

To overcome such a problem, the sector time interval measurer 124 is provided according to this preferred embodiment. Based on the sector time interval that has been measured by the sector time interval measurer 124, the system controller 117 detects the time duration of the sector. Then, the system controller 117 finds the zone where the light beam spot is currently located based on the time duration detected and the rotational speed of the motor.

Figure 19:
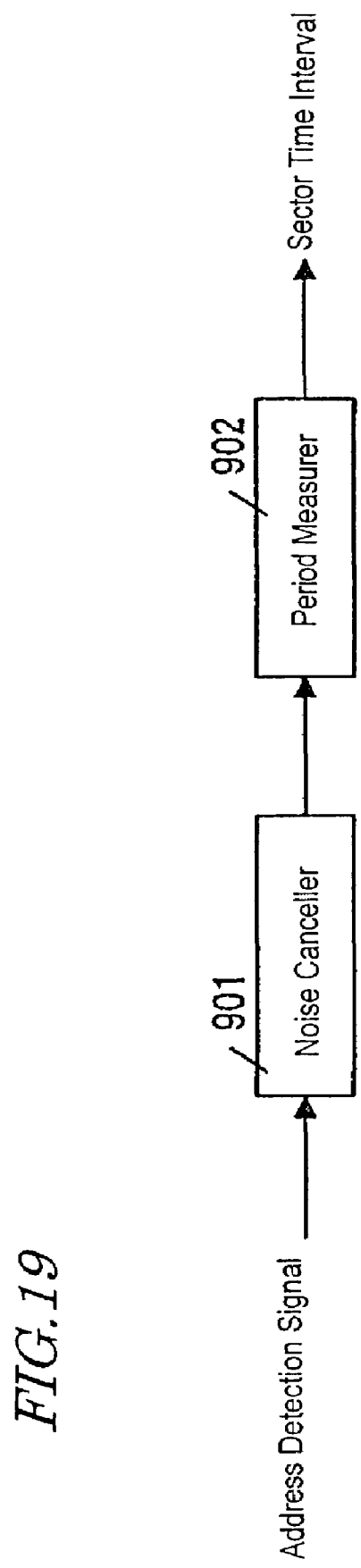
FIG. 19 is a block diagram showing a configuration for a sector time interval measurer that can be used effectively in each of various preferred embodiments of the present invention.

An exemplary configuration for the sector time interval measurer 124 will be described with reference to FIG. 19. As shown in FIG. 19, the sector time interval measurer 124 includes a noise canceller 901 and a period measurer 902. The sector time interval measurer 124 receives the address detection signal from the address section detector 106 and passes it to the noise canceller 901. Then, the period measurer 902 measures the time interval of the signal that has passed through the noise canceller 901. The noise canceller 901 cancels the noise from the address detection signal such that signals representing the address sections 1205 and 1206 are detected consecutively from the address detection signal. In this manner, the sector time interval measurer 124 can measure the time interval of the sector based on the address detection signal.

The system controller 117 and the switches 301 and 302 in the wobble detector 107 (see FIG. 14) together make up a frequency band controller. In accordance with the time interval measured, the frequency band controller selects an appropriate filtering characteristic. More specifically, the system controller 117 finds the zone, in which the light beam spot is now located, based on the sector time interval measured and the rotational speed of the motor. Then, the system controller 117 changes the filtering characteristic of the bandpass filter in the wobble detector 107 such that the bandpass filter can appropriately passes the wobble read frequency at the zone in which the light beam spot is currently located. The filtering characteristics may be changed in this manner by appropriately turning the switched 301 and 302 shown in FIG. 14 as in the method described above.

By adopting such a configuration, even if the track that has been actually reached as a result of the seek operation is way off the target track due to the vibration or impact, a bandpass filter having an appropriate characteristic can still be defined. Thus, the address can be read just as intended.

Embodiment 2

Hereinafter, an optical disc drive according to a second specific preferred embodiment of the present invention will be described. The optical disc drive of this second preferred embodiment basically has the same configuration as the optical disc drive of the first preferred embodiment described above. Thus, the second preferred embodiment of the present invention will be described mainly with reference to FIGS. 12 and 13.

The optical disc drive of this second preferred embodiment is characterized by further including a rotational speed controller for keeping the rotational speed of the disc motor (not shown) substantially constant. Accordingly, the optical disc drive of this preferred embodiment can perform a CAV operation if necessary.

In this preferred embodiment, before the seek operation is started (i.e., while the tracking control is being performed), the selector 206 in the wobble PLL circuit 108 (see FIG. 13) is turned to the side that passes the output of the phase comparator 201. In the meantime, the wobble clock signal is controlled such that the ratio of the frequency of the wobble clock signal to that of the wobble signal equals a predetermined ratio. At this point in time, the wobble clock signal is generated as in the conventional optical disc drive.

Next, as in the first preferred embodiment described above, when the optical disc drive starts to drive the head unit 102 in such a state, the system controller 117 turns OFF the switch 121 shown in FIG. 12, thereby stopping the tracking control. Then, the system controller 117 supplies a control signal to the driving mechanism 123 to drive the head unit 102 toward the target track.

While the head unit 102 is being driven toward the target track after the system controller 117 has turned the switch 121 OFF, the selector 206 of the wobble PLL circuit 108 (see FIG. 13) is turned to the other side that passes the output of the comparator 211.

In this preferred embodiment, while the optical disc drive is performing a CAV read operation with the disc motor rotated at a constant rotational speed, a wobble clock frequency at the destination zone of the seek operation is defined as the "target value" to be input to the comparator 211 of the wobble PLL circuit 108. In this respect, the second preferred embodiment is basically the same as the first preferred embodiment described above. However, the optical disc drive of this second preferred embodiment performs a CAV operation unlike the counterpart of the first preferred embodiment. In the CAV operation, the wobble clock frequency at the destination zone of the seek operation is determined by the disc rotational speed that is always kept constant irrespective of where the light beam spot should be displaced through the seek operation and by the specific location of the destination zone of the seek operation.

Figure 16:
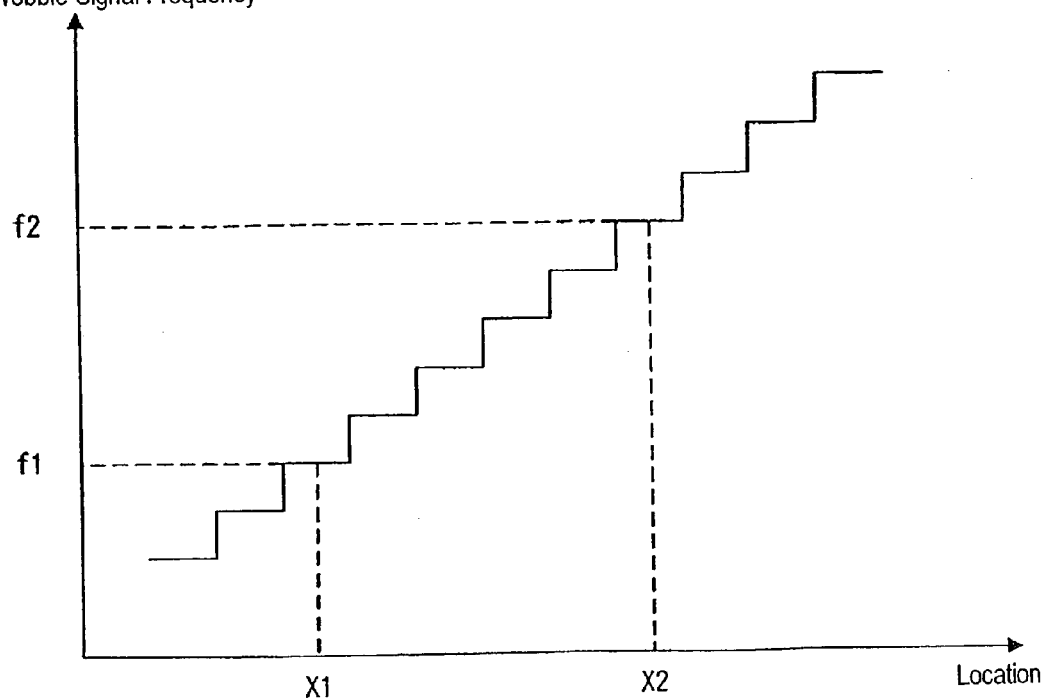
FIG. 16 is a graph showing how the frequency of a wobble signal changes with the location of a beam spot during a CAV read operation.

Next, it will, be described with reference to FIG. 16 how the wobble clock frequency changes with the location of the light beam spot in the disc radial direction when information is read out from the optical disc by the CAV operation. In the CAV read operation to be performed with the disc motor rotated at a constant rotational speed, the wobble clock frequency changes with the specific location of the zone to read the information from. For example, if the head unit 102 is moved from a location X1 to another location X2 (where X1 and X2 are disc locations from which information should be read out), the wobble clock frequency changes from f1 into f2 as shown in FIG. 16.

Thus, the system controller 117 determines the target wobble clock frequency by the location of the destination zone of the seek operation and supplies the frequency to the comparator 211 of the wobble PLL circuit 108 in FIG. 13.

Figure 17:
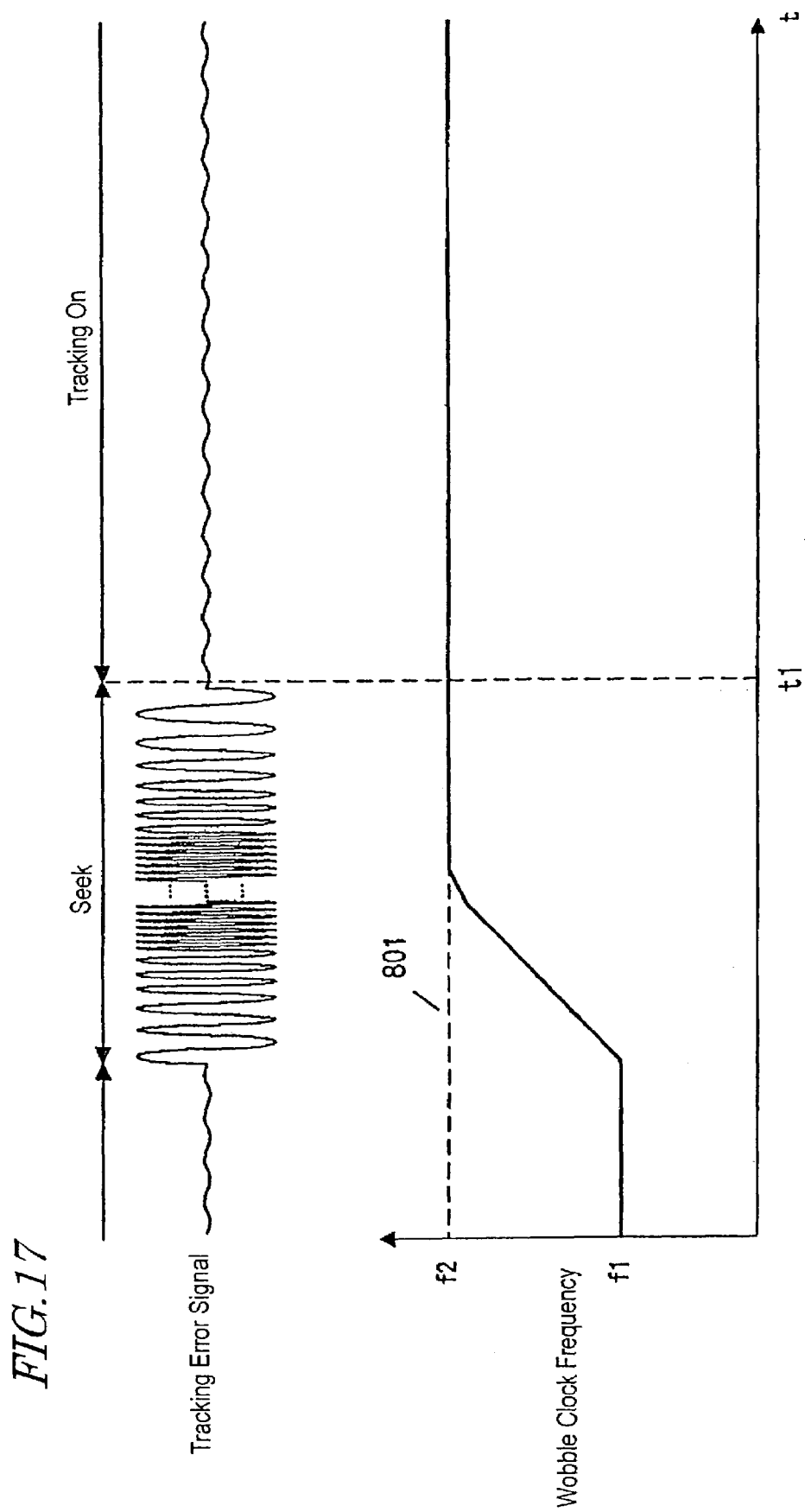
FIG. 17 shows the waveform of a tracking error signal and the frequency of a wobble clock signal before, while and after an optical disc drive according to a second specific preferred embodiment of the present invention performs a seek operation during a CAV read operation.

FIG. 17 shows the waveform of a tracking error signal and the wobble clock frequency in a situation where the optical disc drive of this preferred embodiment, which has been performing a tracking control operation, once suspends the tracking control operation to carry out a seek operation for a while, and then resumes the tracking control operation.

In FIG. 17, a wobble clock frequency, corresponding to the location of a light beam spot before the optical disc drive starts the seek operation, is identified by "f1", while a wobble clock frequency, corresponding to the location that the light beam spot has reached as a result of the seek operation, is identified by "f2". In the example shown in FIG. 17, the light beam spot is displaced outward from an inner track location to an outer track location as a result of the seek operation, and the dashed line 801 indicates the wobble clock frequency at the destination zone of the seek operation.

In this preferred embodiment, before the seek operation is finished, the wobble clock frequency at the destination of the seek operation is obtained and a wobble clock signal having that frequency is generated. Thus, the wobble clock frequency can be brought close to the value indicated by the dashed line 801 in FIG. 17 (i.e., the wobble clock frequency at the destination zone of the seek operation) while the seek operation is being performed.

Furthermore, the optical disc drive of this second preferred embodiment, as well as the counterpart of the first preferred embodiment described above, includes a wobble detector 107 having the configuration shown in FIG. 14. Accordingly, while the optical disc drive is performing the seek operation, the system controller 117 can supply a control signal to the wobble detector 107, thereby defining the pass band of the bandpass filter in such a manner as to easily extract the wobble read frequency at the destination zone of the seek operation.

As soon as the head unit 102 reaches the destination at the time t1, the system controller 117 changes the state of the wobble PLL circuit 108 in FIG. 12 again. More specifically, the system controller 117 not only turns the selector 206 of the wobble PLL circuit 108 (see FIG. 13) to the side that passes the output of the comparator 210 but also turns the switch 121 ON (see FIG. 12). As a result, the optical disc drive starts the tracking control. Thereafter, when the ratio of the frequency of the wobble clock signal to that of the wobble signal equals a predetermined ratio, the system controller 117 turns the selector 206 shown in FIG. 13 again, thereby switching the mode of operation into a PLL phase control in which the wobble signal and the wobble clock signal are synchronized in phase with each other.

By adopting such a configuration, even if the wobble read frequency changes with the specific location of the destination zone of the seek operation, the wobble clock frequency can be substantially equalized with the wobble clock frequency at the destination zone (as indicated by the dashed line 801 in FIG. 17) while the seek operation is still being performed. In this manner, once the head unit 102 has reached the destination, the wobble clock frequency is controlled to the vicinity of the frequency at which data is read, and the bandpass filter for use to generate the wobble signal is also controlled in such a manner as to exhibit an appropriate filtering characteristic to pass the wobble read frequency at the destination zone. Accordingly, the mode of operation of the optical disc drive can be quickly switched into the PLL phase control as soon as the head unit reaches the destination. As a result, the time delay that is normally caused between the end of the seek operation and the start of data reading or writing can be shortened.

In the first and second preferred embodiments described above, soon after the head unit 102 has reached the destination, the selector 206 in the wobble PLL circuit 108 in FIG. 13 is turned to the side that passes the output of the comparator 210 to the phase compensator 203. However, if the frequency control and the transportation of the head unit 102 can be performed highly precisely, the wobble clock frequency can be substantially equalized with the target frequency at the destination. Accordingly, in that case, the selector 206 may be turned such that the output of the comparator 210 is passed to the phase compensator 203 as soon as the seek operation is finished. Then, the mode of operation of the optical disc drive can be quickly switched into the PLL phase control to be performed on the output of the phase comparator 201. As a result, the delay to be caused between the end of the seek operation and the start of data reading or writing can be further reduced.

Even in this second preferred embodiment, the rotational speed of the disc motor may sometimes be changed to change the read rate as in the first preferred embodiment described above. In that case, the characteristic of the bandpass filter may be changed continuously until the rotational speed of the disc motor reaches the vicinity of the target rotational speed as in the first preferred embodiment described above. More specifically, the bandpass filter preferably has its filtering characteristic modified so as to pass a wobble signal having the frequency to be determined by the target read rate, the current rotational speed of the disc motor and the target rotational speed thereof at the zone in which the light beam spot is currently located. Then, the bandpass filter of the wobble detector 107 can always exhibit the desired filtering characteristic. As a result, data can be read or written constantly.

Embodiment 3

Next, an optical disc drive according to a third specific preferred embodiment of the present invention will be described with reference to FIG. 18.

As in the first and second preferred embodiments described above, the optical disc drive of this third preferred embodiment also includes the data PLL circuit 112 with the same configuration as the conventional data PLL circuit. However, unlike the first and second preferred embodiments described above, the optical disc drive of this third preferred embodiment needs no wobble PLL circuit. Thus, in this third preferred embodiment, the data PLL circuit 112 is controlled with the wobble signal.

Figure 6:
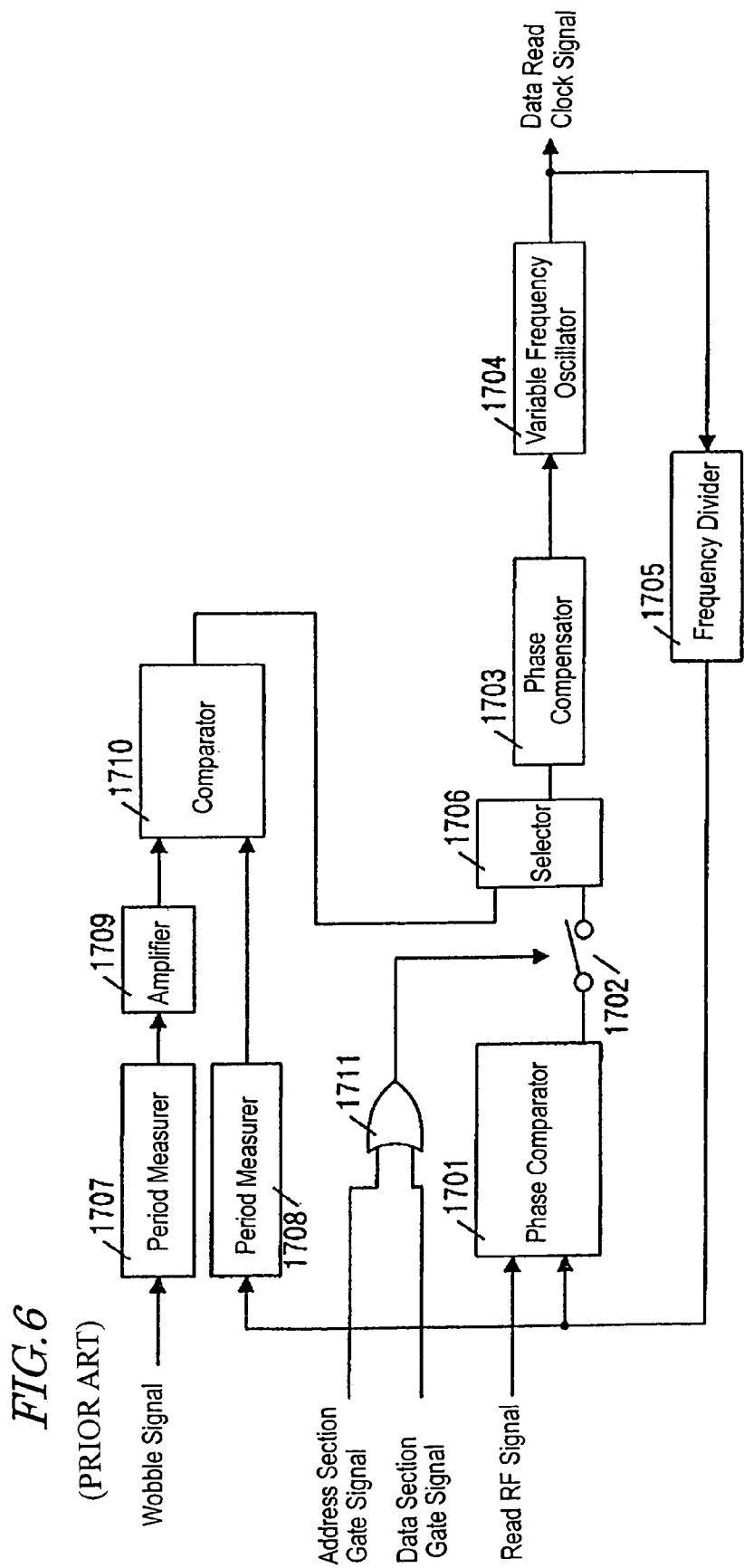
FIG. 6 is a block diagram showing the configuration of a data PLL circuit 112 in the optical disc drive shown in FIG. 3.
Figure 7:
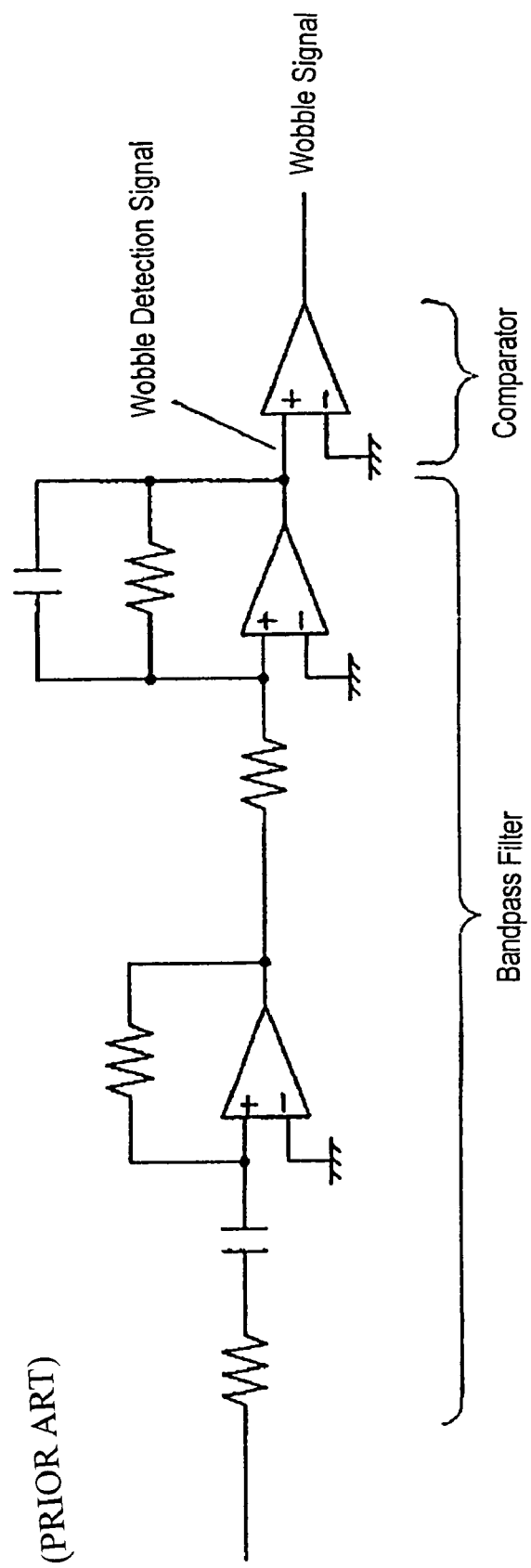
FIG. 7 is a circuit diagram showing the configuration of a wobble detector 1307 in the optical disc drive shown in FIG. 3.

In this preferred embodiment, the data PLL circuit 112 may also have the configuration shown in FIG. 6. Accordingly, in this preferred embodiment, the selector 1706 of the data PLL circuit 112 (see FIG. 6) is also turned to the side that passes the output of the phase comparator 1701 during the tracking control operation. Thus, the read clock signal is controlled in such a manner that the ratio of the frequency of the read clock signal to that of the wobble signal equals a predetermined ratio.

However, as opposed to the preferred embodiments described above, the optical disc drive of this third preferred embodiment does not obtain the wobble clock frequency at the destination zone of the seek operation before the seek operation is finished.

Figure 18:
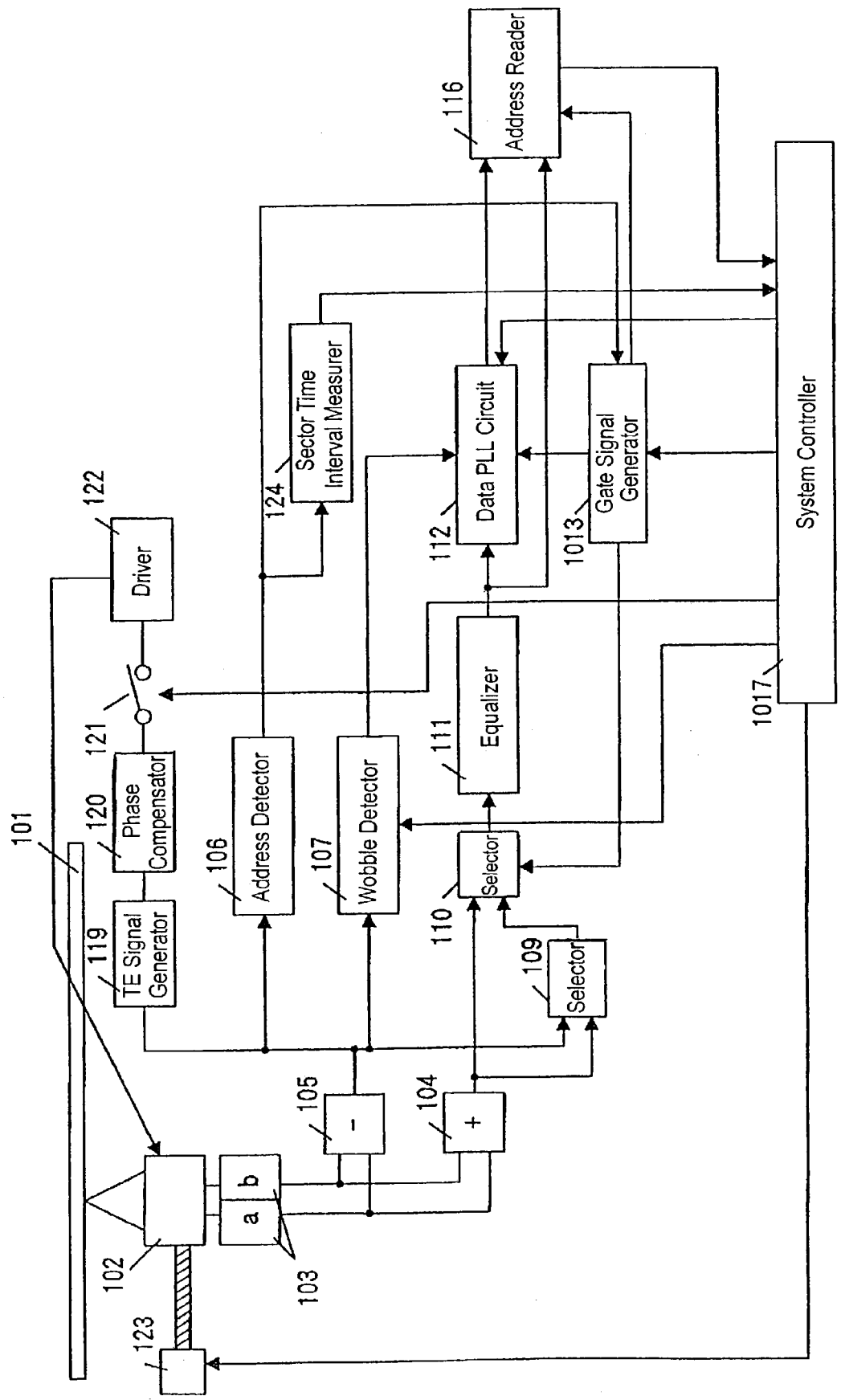
FIG. 18 is a block diagram showing a configuration for an optical disc drive according to a third specific preferred embodiment of the present invention.

In accordance with the instruction of the system controller 1017, the gate signal generator 1013 shown in FIG. 18 outputs an address section gate signal, representing the address section, to the selector 110. This address section gate signal is generated based on the output signal of the address section detector 106.

In reading or writing data from/on the data section, the system controller 1017 instructs the gate signal generator 1013 to output the data section gate signal representing the data section.

In such a state, the system controller 1017 turns the switch 121 OFF and supplies a control signal to the driving mechanism 123, thereby driving the head unit 102 toward the target track.

The system controller 1017 also supplies a control signal to the wobble detector 107, thereby defining the pass band of the bandpass filter appropriately such that the bandpass filter passes the wobble read frequency at the destination zone of the seek operation. Thereafter, when the head unit 102 reaches the destination, the system controller 1017 will turn the switch 121 ON, thereby resuming the tracking control.

By adopting such a configuration, even if the wobble read frequency changes with the specific destination zone of the seek operation, the bandpass filter for generating the wobble signal after the head unit 102 reaches the destination can have its filtering characteristic adjusted to the wobble read frequency at the destination zone of the seek operation. Thus, a data read or write operation can be started quickly once the head unit 102 reaches the destination.

According to various preferred embodiments of the present invention described above, the wobble PLL circuit may be controlled and/or the filtering characteristic of the bandpass filter may be switched in such a manner as to obtain the wobble clock frequency at the destination track (or zone) while the seek operation is still being performed. By modifying the characteristic of the bandpass filter according to the specific location of the destination zone of the seek operation, the wobble PLL circuit can always be operated with good stability. In addition, the time delay that is normally caused between the end of the seek operation and the start of data reading or writing can be shortened significantly.

It should be noted that to select an appropriate filtering characteristic for the bandpass filter, the velocity at which the light beam spot is displaced on the optical disc (which will be referred to herein as the "linear velocity") needs to be defined properly. When the optical disc drive performs a CAV operation, the linear velocity may be determined by the specific track (or zone) on which the light beam spot is currently located. On the other hand, when the optical disc drive performs a ZCLV operation, the linear velocity may be determined by the specific track (or zone) on which the light beam spot is currently located and the rotational speed of the disc motor.

Also, if the sector time interval (or address section interval) is measured as described above, then the actual linear velocity can be known. Accordingly, even if the actual location of the light beam spot is way off the original target location when the seek operation is finished, the wobble signal can still be read as intended because the filtering characteristic may also be defined appropriately.

In various preferred embodiments of the present invention described above, the optical disc has an information recording area that is divided into a plurality of concentric zones, and information is recorded on the optical disc such that the innermost track of each zone has substantially the same highest recording linear density all over the optical disc and that each zone has variable recording linear densities that decrease outward from the highest recording linear density of the innermost track. However, the present invention is in no way limited to those specific preferred embodiments. For example, the tracks of the optical disc do not have to define a simple sine wave wobble pattern but may be made up of multiple types of wobble patterns. In other words, an optical disc drive according to any of various preferred embodiments of the present invention described above may be used to read and/or write information not only from/on a DVD-RAM but also from/on a blue-ray disc. On a blue-ray disc, at least a portion of a wobbled track represents ID information such as address information.

An optical disc drive according to any of various preferred embodiments of the present invention described above starts the operation of obtaining a wobble clock frequency at the destination track of a seek operation while still performing the seek operation. Thus, the optical disc drive can quickly start reading data on finishing the seek operation.

In a preferred embodiment in which the optical disc drive includes a rotational speed detector for detecting the rotational speed of the optical disc, the rotational speed of the optical disc changes with the specific location of the light beam spot on the optical disc as in a ZCLV operation. However, the optical disc drive can correct the clock signal frequency into a frequency associated with the specific destination track of the seek operation based on the detected rotational speed of the optical disc. Thus, a clock signal having an appropriate frequency can be generated.

An optical disc drive according to another preferred embodiment of the present invention extracts a read signal, representing a clock synchronization mark, by using a bandpass filter having a variable frequency band. By changing the frequency band of the filter according to the linear velocity detected, the read signal representing the clock synchronization mark can also be extracted and output appropriately even at the destination track of the seek operation.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disc drive for reading and/or writing information from/onto an optical disc by focusing a light beam onto the disc, the optical disc including a clock synchronization mark and a data section on which the information is recordable, the optical disc drive comprising:

a motor for rotating the optical disc thereon;

a photoelectric transducer for converting the light beam, reflected from or transmitted through the optical disc, into an electric signal and outputting the electric signal;

a bandpass filter for extracting and outputting a signal in a particular frequency band from the electric signal that has been output from the photoelectric transducer, the frequency band being variable;

a clock sync signal reader for extracting and outputting a read signal, representing the clock synchronization mark, from the output signal of the bandpass filter;

a clock generator for generating a clock signal having a variable frequency;

a phase locking controller for controlling the clock generator in such a manner as to synchronize the clock signal in phase with the output signal of the clock sync signal reader;

a linear velocity detector for detecting the linear velocity of the optical disc; and a frequency band controller for controlling the frequency band to be extracted by the bandpass filter in accordance with the output of the linear velocity detector, wherein while the optical disc drive is performing a seek operation to displace the light beam spot toward a target track on the optical disc, the frequency band controller controls the frequency band so as to pass a clock frequency to be expected on the target track before the seek operation is finished, the optical disc drive further comprising:

a mechanism for displacing a spot of the light beam on the optical disc toward a target track on the optical disc; and a rotational speed detector for detecting the rotational speed of the optical disc, the rotational speed being changeable with where the light beam spot is located on the optical disc, wherein the linear velocity detector detects the linear velocity at a frequency to be determined by the detected rotational speed of the optical disc and a target rotational speed at a zone to which the target track belongs, and wherein after the seek operation, the frequency band controller continuously changes the frequency band to be extracted by the bandpass filter until rotational speed of the motor substantially reaches target rotational speed to be expected on the target track.

2. The optical disc drive of claim 1, wherein the optical disc has an information recording area that is divided into a plurality of concentric zones, each including a plurality of tracks, and wherein the information is recorded on the optical disc such that the innermost track of each said zone has substantially the same highest recording linear density all over the optical disc and that each said zone has variable recording linear densities that decrease outward from the highest recording linear density of the innermost track, and wherein each said zone includes the clock synchronization marks and the data sections on which the information is recordable.

3. The optical disc drive of claim 1, wherein each said track of the optical disc has a wobbling structure that shifts periodically in a radial direction, and wherein the wobbling structure functions as the clock synchronization mark.

4. The optical disc drive of claim 3, wherein the wobbling structure of each said track on the optical disc also functions as a portion to record address information thereon.

5. An optical disc drive for reading and/or writing information from/onto an optical disc by focusing a light beam onto the disc, the optical disc including a clock synchronization mark and a data section on which the information is recordable, the optical disc drive comprising:

a motor for rotating the optical disc thereon;

a photoelectric transducer for converting the light beam, reflected from or transmitted through the optical disc, into an electric signal and outputting the electric signal;

a bandpass filter for extracting and outputting a signal in a particular frequency band from the electric signal that has been output from the photoelectric transducer, the frequency band being variable;

a clock sync signal frequency detector for detecting the frequency of a read signal, representing the clock synchronization mark, based on the output signal of the bandpass filter;

a read clock generator for generating a read clock signal having a variable frequency;

a frequency controller for controlling the read clock generator such that the ratio of the frequency of the read clock signal to the output frequency of the clock sync signal frequency detector equals a predetermined ratio;

a phase locking controller for controlling the read clock generator in such a manner as to synchronize the read clock signal in phase with the electric signal that has been output from the photoelectric transducer;

a linear velocity detector for detecting the linear velocity of the optical disc; and a frequency band controller for controlling the frequency band to be extracted by the bandpass filter in accordance with the output of the linear velocity detector, wherein while the optical disc drive is performing a seek operation to displace the light beam spot toward a target track on the optical disc, the frequency band controller controls the frequency band so as to pass a clock frequency to be expected on the target track before the seek operation is finished, the optical disc drive further comprising:

a mechanism for displacing a spot of the light beam on the optical disc toward a target track on the optical disc; and a rotational speed detector for detecting the rotational speed of the optical disc, the rotational speed being changeable with where the light beam spot is located on the optical disc, wherein the linear velocity detector detects the linear velocity at a frequency to be determined by the detected rotational speed of the optical disc and a target rotational speed at a zone to which the target track belongs, and wherein after the seek operation, the frequency band controller continuously changes the frequency band to be extracted by the bandpass filter until rotational speed of the motor substantially reaches target rotational speed to be expected on the target track.

6. An optical disc drive for reading and/or writing information from/onto an optical disc by focusing a light beam onto the disc, the optical disc including a clock synchronization mark and a data section on which the information is recordable, the optical disc drive comprising:

a motor for rotating the optical disc thereon;

a photoelectric transducer for converting the light beam, reflected from or transmitted through the optical disc, into an electric signal and outputting the electric signal;

a bandpass filter for extracting and outputting a signal in a particular frequency band from the electric signal that has been output from the photoelectric transducer, the frequency band being variable;

a clock sync signal reader for extracting and outputting a read signal, representing the clock synchronization mark, from the output signal of the bandpass filter;

a clock generator for generating a clock signal having a variable frequency;

a phase locking controller for controlling the clock generator in such a manner as to synchronize the clock signal in phase with the output signal of the clock sync signal reader;

a linear velocity detector for detecting the linear velocity of the optical disc; and a frequency band controller for controlling the frequency band to be extracted by the bandpass filter in accordance with the output of the linear velocity detector, wherein while the optical disc drive is performing a seek operation to displace the light beam spot toward a target track on the optical disc, the frequency band controller controls the frequency band so as to pass a clock frequency to be expected on the target track before the seek operation is finished, the optical disc drive further comprising:

a mechanism for displacing a spot of the light beam on the optical disc toward a target track on the optical disc; and a rotational speed controller for keeping the rotational speed of the optical disc substantially constant, wherein the linear velocity detector detects the linear velocity depending on to which zone the target track belongs, wherein when changing the rotational speed of the motor to change the read rate, the frequency band controller continuously changes the frequency band to be extracted by the bandpass filter until rotational speed of the motor substantially reaches target rotational speed to be expected on the target track.

7. The optical disc drive of claim 6, wherein each said track on the optical disc includes an address section, and wherein the optical disc drive further comprises:

an address section detector for detecting the address section based on the electric signal that has been output from the photoelectric transducer; and a sector time interval measurer for measuring a time interval at which the light beam passes a sector based on the output of the address section detector, wherein the linear velocity detector detects the linear velocity in accordance with the output of the sector time interval measurer.

8. An optical disc drive for reading and/or writing information from/onto an optical disc by focusing a light beam onto the disc, the optical disc including a clock synchronization mark and a data section on which the information is recordable, the optical disc drive comprising:

a motor for rotating the optical disc thereon;

a photoelectric transducer for converting the light beam, reflected from or transmitted through the optical disc, into an electric signal and outputting the electric signal;

a bandpass filter for extracting and outputting a signal in a particular frequency band from the electric signal that has been output from the photoelectric transducer, the frequency band being variable;

a clock sync signal frequency detector for detecting the frequency of a read signal, representing the clock synchronization mark, based on the output signal of the bandpass filter;

a read clock generator for generating a read clock signal having a variable frequency;

a frequency controller for controlling the read clock generator such that the ratio of the frequency of the read clock signal to the output frequency of the clock sync signal frequency detector equals a predetermined ratio;

a phase locking controller for controlling the read clock generator in such a manner as to synchronize the read clock signal in phase with the electric signal that has been output from the photoelectric transducer;

a linear velocity detector for detecting the linear velocity of the optical disc; and a frequency band controller for controlling the frequency band to be extracted by the bandpass filter in accordance with the output of the linear velocity detector, wherein while the optical disc drive is performing a seek operation to displace the light beam spot toward a target track on the optical disc, the frequency band controller controls the frequency band so as to pass a clock frequency to be expected on the target track before the seek operation is finished, the optical disc drive further comprising:

a mechanism for displacing a spot of the light beam on the optical disc toward a target track on the optical disc; and a rotational speed controller for keeping the rotational speed of the optical disc substantially constant, wherein the linear velocity detector detects the linear velocity depending on to which zone the target track belongs, wherein when changing the rotational speed of the motor to change the read rate, the frequency band controller continuously changes the frequency band to be extracted by the bandpass filter until rotational speed of the motor substantially reaches target rotational speed to be expected on the target track.

9. The optical disc drive of claim 8, wherein each said track on the optical disc includes an address section, and wherein the optical disc drive further comprises:

an address section detector for detecting the address section based on the electric signal that has been output from the photoelectric transducer; and a sector time interval measurer for measuring a time interval at which the light beam passes a sector based on the output of the address section detector, wherein the linear velocity detector detects the linear velocity in accordance with the output of the sector time interval measurer.

* * * * *